United States Patent
Johnke et al.

(10) Patent No.: US 9,074,814 B2
(45) Date of Patent: Jul. 7, 2015

(54) HYDROCARBON GAS PROCESSING

(75) Inventors: Andrew F. Johnke, Beresford, SD (US); W. Larry Lewis, Houston, TX (US); L. Don Tyler, Midland, TX (US); John D. Wilkinson, Midland, TX (US); Joe T. Lynch, Midland, TX (US); Hank M. Hudson, Midland, TX (US); Kyle T. Cuellar, Katy, TX (US)

(73) Assignees: Ortloff Engineers, Ltd., Midland, TX (US); S.M.E. Products LP, Houston, TX (US)

( * ) Notice: Subject to any disclaimer, the term of this patent is extended or adjusted under 35 U.S.C. 154(b) by 976 days.

(21) Appl. No.: 13/051,682

(22) Filed: Mar. 18, 2011

(65) Prior Publication Data

US 2011/0232328 A1  Sep. 29, 2011

Related U.S. Application Data

(63) Continuation-in-part of application No. 13/048,315, filed on Mar. 15, 2011, which is a continuation-in-part of application No. 12/689,616, filed on Jan. 19, 2010, now Pat. No. 9,021,831, which is a
(Continued)

(51) Int. Cl.
*F25J 3/00* (2006.01)
*F25J 3/02* (2006.01)
(Continued)

(52) U.S. Cl.
CPC .............. *F25J 3/0209* (2013.01); *F25J 3/0233* (2013.01); *F25J 3/0242* (2013.01);
(Continued)

(58) Field of Classification Search
CPC ....... F25J 3/0209; F25J 3/0233; F25J 3/0242; F25J 3/0238; F25J 2270/12; F25J 2200/70; F25J 2240/02; F25J 2200/74; F25J 2270/60; F25J 2290/42; F25J 2270/02; F25J 2200/02; F25J 2205/02; F25J 2210/06; F25J 2235/60; F25J 2290/40; F25J 2200/80; F25J 2205/04
USPC ................................................... 62/618–623
See application file for complete search history.

(56) References Cited

U.S. PATENT DOCUMENTS

| 33,408 A | 10/1861 | Turner et al. .................. 68/22 R |
| 3,292,380 A | 12/1966 | Bucklin .......................... 62/621 |

(Continued)

OTHER PUBLICATIONS

Mowrey, E. Ross., "Efficient, High Recovery of Liquids from Natural Gas Utilizing a High Pressure Absorber," Proceedings of the Eighty-First Annual Convention of the Gas Processors Association, Dallas, Texas, Mar. 11-13, 2002—10 pages.
(Continued)

*Primary Examiner* — Frantz Jules
*Assistant Examiner* — Keith Raymond
(74) *Attorney, Agent, or Firm* — Fitzpatrick, Cella, Harper & Scinto

(57) ABSTRACT

A process and an apparatus are disclosed for a compact processing assembly to recover propane, propylene, and heavier hydrocarbon components from a hydrocarbon gas stream. The gas stream is cooled, expanded to lower pressure, and fed to an absorbing means. A first distillation liquid stream from the absorbing means is fed to a mass transfer means. A first distillation vapor stream from the mass transfer means is cooled to partially condense it, forming a residual vapor stream and a condensed stream. The condensed stream is supplied as the top feed to the absorbing means. A second distillation vapor stream from the absorbing means is heated by cooling the first distillation vapor stream, combined with the residual vapor stream, and heated by cooling the gas stream. A second distillation liquid stream from the mass transfer means is heated in a heat and mass transfer means to strip out its volatile components.

45 Claims, 21 Drawing Sheets

Figure 1:
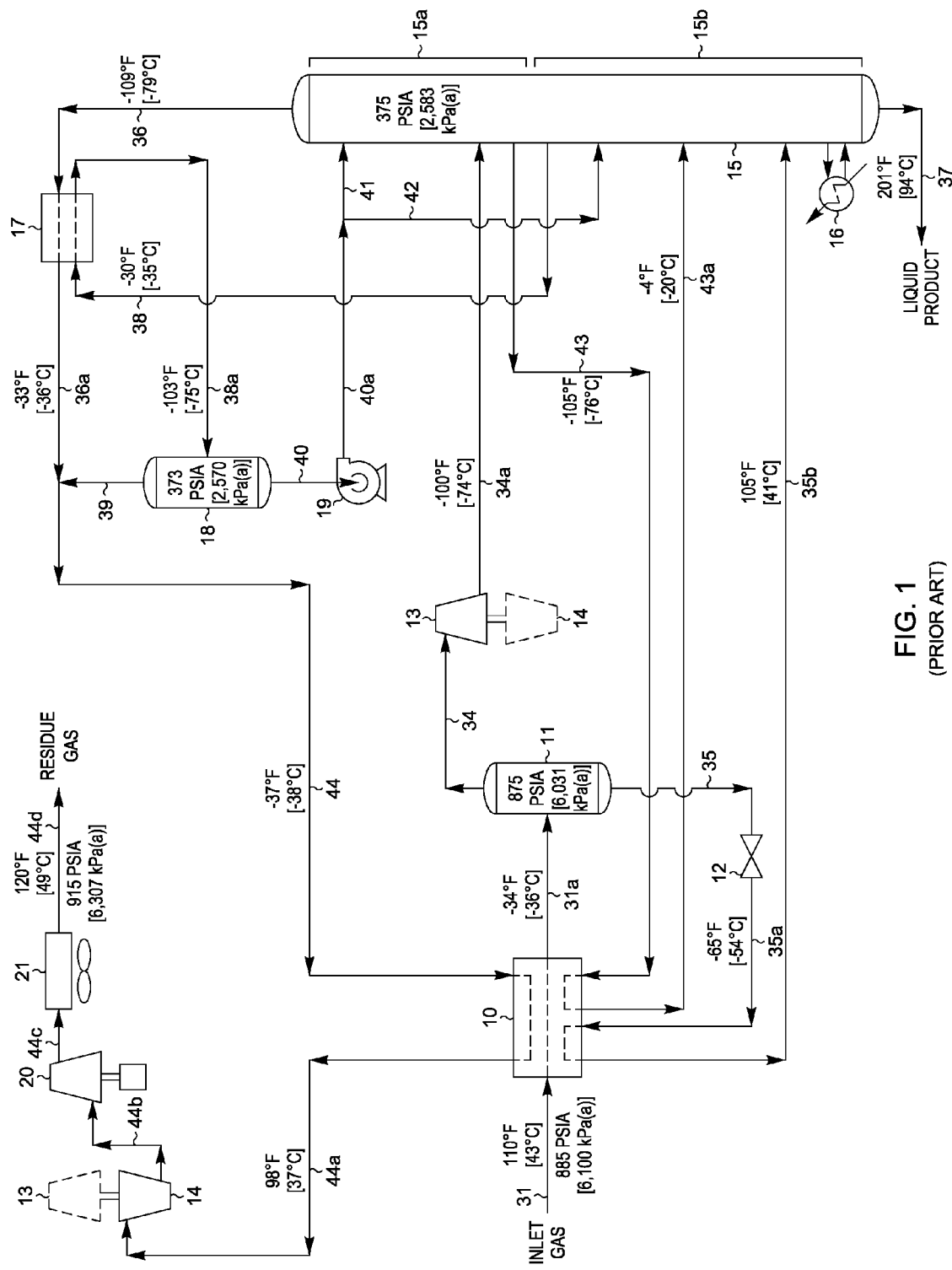

Related U.S. Application Data continuation-in-part of application No. 12/372,604, filed on Feb. 17, 2009, application No. 13/051,682, which is a continuation-in-part of application No. 12/781,259, filed on May 17, 2010, which is a continuation-in-part of application No. 12/772,472, filed on May 3, 2010, which is a continuation-in-part of application No. 12/750,862, filed on Mar. 31, 2010, now Pat. No. 8,881,549, which is a continuation-in-part of application No. 12/717,394, filed on Mar. 4, 2010, which is a continuation-in-part of application No. 12/689,616, filed on Jan. 19, 2010, now Pat. No. 9,021,831, which is a continuation-in-part of application No. 12/372,604, filed on Feb. 17, 2009.

(60) Provisional application No. 61/186,361, filed on Jun. 11, 2009.

(51) Int. Cl.
 *C10G 5/04* (2006.01)
 *C10G 5/06* (2006.01)

(52) U.S. Cl.
 CPC .......... *F25J 2200/02* (2013.01); *F25J 2200/30* (2013.01); *F25J 2200/74* (2013.01); *F25J 2200/78* (2013.01); *F25J 2205/02* (2013.01); *F25J 2205/04* (2013.01); *F25J 2235/60* (2013.01); *F25J 2240/02* (2013.01); *F25J 2270/12* (2013.01); *F25J 2270/60* (2013.01); *F25J 2290/40* (2013.01); *C10G 5/04* (2013.01); *C10G 5/06* (2013.01); *C10G 2300/1025* (2013.01)

(56) References Cited

U.S. PATENT DOCUMENTS

| | | | |
|---|---|---|---|
| 3,477,915 A * | 11/1969 | Gantt et al. | 202/155 |
| 3,508,412 A | 4/1970 | Yearout | |
| 3,516,261 A * | 6/1970 | Hoffman | 62/622 |
| 3,625,017 A | 12/1971 | Hoffman | |
| 3,797,261 A * | 3/1974 | Juncker et al. | 62/622 |
| 3,983,711 A | 10/1976 | Solomon | 62/630 |
| 4,061,481 A | 12/1977 | Campbell et al. | 62/621 |
| 4,127,009 A | 11/1978 | Phillips | |
| 4,140,504 A | 2/1979 | Campbell et al. | 62/621 |
| 4,157,904 A | 6/1979 | Campbell et al. | 62/623 |
| 4,171,964 A | 10/1979 | Campbell et al. | 62/621 |
| 4,185,978 A | 1/1980 | McGalliard et al. | 62/634 |
| 4,251,249 A | 2/1981 | Gulsby | 62/621 |
| 4,278,457 A | 7/1981 | Campbell et al. | 62/621 |
| 4,519,824 A | 5/1985 | Huebel | 62/621 |
| 4,617,039 A | 10/1986 | Buck | 62/621 |
| 4,687,499 A | 8/1987 | Aghili | 62/621 |
| 4,688,399 A | 8/1987 | Reimann | |
| 4,689,063 A | 8/1987 | Paradowski et al. | 62/621 |
| 4,690,702 A | 9/1987 | Paradowski et al. | 62/621 |
| 4,854,955 A | 8/1989 | Campbell et al. | 62/621 |
| 4,869,740 A | 9/1989 | Campbell et al. | 62/621 |
| 4,889,545 A | 12/1989 | Campbell et al. | 62/621 |
| 5,255,528 A | 10/1993 | Dao | |
| 5,275,005 A | 1/1994 | Campbell et al. | 62/621 |
| 5,282,507 A | 2/1994 | Tongu et al. | |
| 5,316,628 A | 5/1994 | Collin et al. | |
| 5,335,504 A | 8/1994 | Durr et al. | 62/632 |
| 5,339,654 A | 8/1994 | Cook et al. | |
| 5,367,884 A | 11/1994 | Phillips et al. | |
| 5,410,885 A | 5/1995 | Smolarek et al. | |
| 5,555,748 A | 9/1996 | Campbell et al. | 62/621 |
| 5,566,554 A | 10/1996 | Vijayaraghavan et al. | 62/621 |
| 5,568,737 A | 10/1996 | Campbell et al. | 62/621 |
| 5,675,054 A | 10/1997 | Manley et al. | 585/809 |
| 5,685,170 A | 11/1997 | Sorensen | 62/625 |
| 5,713,216 A * | 2/1998 | Erickson | 62/476 |
| 5,771,712 A | 6/1998 | Campbell et al. | 62/621 |
| 5,799,507 A * | 9/1998 | Wilkinson et al. | 62/621 |
| 5,881,569 A | 3/1999 | Campbell et al. | 62/621 |
| 5,890,377 A * | 4/1999 | Foglietta | 62/621 |
| 5,890,378 A | 4/1999 | Rambo et al. | 62/621 |
| 5,942,164 A * | 8/1999 | Tran | 261/128 |
| 5,983,664 A | 11/1999 | Campbell et al. | 62/621 |
| 6,182,469 B1 | 2/2001 | Campbell et al. | 62/621 |
| 6,361,582 B1 | 3/2002 | Pinnau et al. | 95/45 |
| 6,516,631 B1 | 2/2003 | Trebble | 62/630 |
| 6,565,626 B1 | 5/2003 | Baker et al. | 95/47 |
| 6,578,379 B2 | 6/2003 | Paradowski | 62/622 |
| 6,694,775 B1 | 2/2004 | Higginbotham et al. | 62/643 |
| 6,712,880 B2 | 3/2004 | Foglietta et al. | 95/184 |
| 6,915,662 B2 | 7/2005 | Wilkinson et al. | 62/621 |
| 7,165,423 B2 | 1/2007 | Winningham | 62/620 |
| 7,191,617 B2 * | 3/2007 | Cuellar et al. | 62/628 |
| 7,210,311 B2 | 5/2007 | Wilkinson et al. | 62/611 |
| 7,219,513 B1 | 5/2007 | Mostafa | 62/620 |
| 2002/0166336 A1 | 11/2002 | Wilkinson et al. | 62/620 |
| 2004/0079107 A1 | 4/2004 | Wilkinson et al. | 62/611 |
| 2004/0172967 A1 | 9/2004 | Patel et al. | 62/620 |
| 2005/0229634 A1 | 10/2005 | Huebel et al. | 62/632 |
| 2005/0247078 A1 | 11/2005 | Wilkinson et al. | 62/621 |
| 2005/0268649 A1 | 12/2005 | Wilkinson et al. | 62/613 |
| 2006/0032269 A1 | 2/2006 | Cuellar et al. | 62/620 |
| 2006/0086139 A1 | 4/2006 | Eaton et al. | 62/612 |
| 2006/0283207 A1 | 12/2006 | Pitman et al. | 62/620 |
| 2008/0000265 A1 | 1/2008 | Cuellar et al. | 62/630 |
| 2008/0078205 A1 | 4/2008 | Cuellar et al. | 62/620 |
| 2008/0190136 A1 | 8/2008 | Pitman et al. | 62/620 |
| 2008/0271480 A1 | 11/2008 | Mak | 62/626 |
| 2009/0100862 A1 | 4/2009 | Wilkinson et al. | 62/621 |
| 2009/0107175 A1 | 4/2009 | Patel et al. | 62/620 |
| 2010/0236285 A1 | 9/2010 | Johnke et al. | 62/620 |
| 2010/0251764 A1 | 10/2010 | Johnke et al. | 62/620 |
| 2010/0275647 A1 | 11/2010 | Johnke et al. | 62/620 |
| 2010/0287983 A1 | 11/2010 | Johnke et al. | 62/620 |
| 2010/0287984 A1 | 11/2010 | Johnke et al. | 62/620 |
| 2010/0326134 A1 | 12/2010 | Johnke et al. | 62/620 |
| 2011/0226011 A1 | 9/2011 | Johnke et al. | 62/620 |
| 2011/0226012 A1 | 9/2011 | Johnke et al. | 62/620 |
| 2011/0226013 A1 | 9/2011 | Johnke et al. | 62/620 |
| 2011/0226014 A1 | 9/2011 | Johnke et al. | 62/620 |

OTHER PUBLICATIONS

"Dew Point Control Gas Conditioning Units," SME Products Brochure, Gas Processors Assoc. Conference (Apr. 5, 2009).

"Fuel Gas Conditioning Units for Compressor Engines," SME Products Brochure, Gas Processors Assoc. Conference (Apr. 5, 2009).

"P&ID Fuel Gas Conditioner," Drawing No. SMEP-901, Date Drawn: Aug. 29, 2007, SME, available at http://www.sme-llc.com/sme.cfm?a=prd&catID=58&subID=44&prdID=155 (Apr. 24, 2009).

"Fuel Gas Conditioner Preliminary Arrangement," Drawing No. SMP-1007-00, Date Drawn: Nov. 11, 2008, SME, available at http://www.sme-llc.com/sme.cfm?a=prd&catID=58&subID=44&prdID=155 (Apr. 24, 2009).

"Product: Fuel Gas Conditioning Units," SME Associates, LLC, available at http://www.sme-llc.com/sme.cfm?a=prd&catID=58&subID=44&prdID=155 (Apr. 24, 2009).

International Search Report and Written Opinion issued in International Application No. PCT/US2010/21364 dated Jul. 9, 2010—pages.

International Search Report and Written Opinion issued in International Application No. PCT/US2011/028872 dated May 18, 2011—6 pages.

International Search Report and Written Opinion issued in International Application No. PCT/US2010/26185 dated Jul. 9, 2010—20 pages.

International Search Report and Written Opinion issued in International Application No. PCT/US2011/29234 dated May 20, 2011—29 pages.

(56) References Cited

OTHER PUBLICATIONS

International Search Report and Written Opinion issued in International Application No. PCT/US2010/29331 dated Jul. 2, 2010—15 pages.
International Search Report and Written Opinion issued in International Application No. PCT/US2011/029034 dated Jul. 27, 2011—39 pages.
International Search Report and Written Opinion issued in International Application No. PCT/US2010/33374 dated Jul. 9, 2010—18 pages.
International Search Report and Written Opinion issued in International Application No. PCT/US2011/029409 dated May 17, 2011—14 pages.
International Search Report and Written Opinion issued in International Application No. PCT/US2010/35121 dated Jul. 19, 2010—18 pages.
International Search Report and Written Opinion issued in International Application No. PCT/US2011/029239 dated May 20, 2011—20 pages.
International Search Report and Written Opinion issued in International Application No. PCT/US2010/037098 dated Aug. 17, 2010—12 pages.
Advisory Action Before the Filing of an Appeal Brief issued in U.S. Appl. No. 12/689,616, dated Nov. 28, 2014 (3 pages).
Submission Under 37 C.F.R. § 1.114, Statement of Interview, and Petition for Extension of Time filed in U.S. Appl. No. 12/689,616, dated Dec. 8, 2014 (39 pages).

\* cited by examiner

HYDROCARBON GAS PROCESSING

This invention relates to a process and apparatus for the separation of a gas containing hydrocarbons. The applicants claim the benefits under Title 35, United States Code, Section 119(e) of prior U.S. Provisional Application No. 61/186,361 which was filed on Jun. 11, 2009. The applicants also claim the benefits under Title 35, United States Code, Section 120 as a continuation-in-part of U.S. patent application Ser. No. 13/048,315 which was filed on Mar. 15, 2011, and as a continuation-in-part of U.S. patent application Ser. No. 12/781,259 which was filed on May 17, 2010, and as a continuation-in-part of U.S. patent application Ser. No. 12/772,472 which was filed on May 3, 2010, and as a continuation-in-part of U.S. patent application Ser. No. 12/750,862 which was filed on Mar. 31, 2010, and as a continuation-in-part of U.S. patent application Ser. No. 12/717,394 which was filed on Mar. 4, 2010, and as a continuation-in-part of U.S. patent application Ser. No. 12/689,616 which was filed on Jan. 19, 2010, and as a continuation-in-part of U.S. patent application Ser. No. 12/372,604 which was filed on Feb. 17, 2009. Assignees S.M.E. Products LP and Ortloff Engineers, Ltd. were parties to a joint research agreement that was in effect before the invention of this application was made.

BACKGROUND OF THE INVENTION

Propylene, propane, and/or heavier hydrocarbons can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, i.e., methane and ethane together comprise at least 50 mole percent of the gas. The gas also contains relatively lesser amounts of heavier hydrocarbons such as propane, butanes, pentanes, and the like, as well as hydrogen, nitrogen, carbon dioxide, and other gases.

The present invention is generally concerned with the recovery of propylene, propane, and heavier hydrocarbons from such gas streams. A typical analysis of a gas stream to be processed in accordance with this invention would be, in approximate mole percent, 88.4% methane, 6.2% ethane and other $C_2$ components, 2.6% propane and other $C_3$ components, 0.3% iso-butane, 0.6% normal butane, and 0.8% pentanes plus, with the balance made up of nitrogen and carbon dioxide. Sulfur containing gases are also sometimes present.

The historically cyclic fluctuations in the prices of both natural gas and its natural gas liquid (NGL) constituents have at times reduced the incremental value of propane, propylene, and heavier components as liquid products. This has resulted in a demand for processes that can provide more efficient recoveries of these products and for processes that can provide efficient recoveries with lower capital investment. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas being processed. Depending upon the pressure of the gas source, the richness (ethane, ethylene, and heavier hydrocarbons content) of the gas, and the desired end products, each of these processes or a combination thereof may be employed.

The cryogenic expansion process is now generally preferred for natural gas liquids recovery because it provides maximum simplicity with ease of startup, operating flexibility, good efficiency, safety, and good reliability. U.S. Pat. Nos. 3,292,380; 4,061,481; 4,140,504; 4,157,904; 4,171,964; 4,185,978; 4,251,249; 4,278,457; 4,519,824; 4,617,039; 4,687,499; 4,689,063; 4,690,702; 4,854,955; 4,869,740; 4,889,545; 5,275,005; 5,555,748; 5,566,554; 5,568,737; 5,771,712; 5,799,507; 5,881,569; 5,890,378; 5,983,664; 6,182,469; 6,578,379; 6,712,880; 6,915,662; 7,191,617; 7,219,513; reissue U.S. Pat. No. 33,408; and co-pending application Ser. Nos. 11/430,412; 11/839,693; 11/971,491; 12/206,230; 12/689,616; 12/717,394; 12/750,862; 12/772,472; 12/781,259; 12/868,993; 12/869,007; 12/869,139; 12/979,563; and 13/048,315 describe relevant processes (although the description of the present invention in some cases is based on different processing conditions than those described in the cited U.S. patents).

In a typical cryogenic expansion recovery process, a feed gas stream under pressure is cooled by heat exchange with other streams of the process and/or external sources of refrigeration such as a propane compression-refrigeration system. As the gas is cooled, liquids may be condensed and collected in one or more separators as high-pressure liquids containing some of the desired $C_3$+ components. Depending on the richness of the gas and the amount of liquids formed, the high-pressure liquids may be expanded to a lower pressure and fractionated. The vaporization occurring during expansion of the liquids results in further cooling of the stream. Under some conditions, pre-cooling the high pressure liquids prior to the expansion may be desirable in order to further lower the temperature resulting from the expansion. The expanded stream, comprising a mixture of liquid and vapor, is fractionated in a distillation (deethanizer) column. In the column, the expansion cooled stream(s) is (are) distilled to separate residual methane, $C_2$ components, nitrogen, and other volatile gases as overhead vapor from the desired $C_3$ components and heavier hydrocarbon components as bottom liquid product.

If the feed gas is not totally condensed (typically it is not), the vapor remaining from the partial condensation can be passed through a work expansion machine or engine, or an expansion valve, to a lower pressure at which additional liquids are condensed as a result of further cooling of the stream. The expanded stream then enters an absorbing section in the column and is contacted with cold liquids to absorb the $C_3$ components and heavier components from the vapor portion of the expanded stream. The liquids from the absorbing section are then directed to the deethanizing section of the column.

A distillation vapor stream is withdrawn from the upper region of the deethanizing section and is cooled by heat exchange relation with the overhead vapor stream from the absorbing section, condensing at least a portion of the distillation vapor stream. The condensed liquid is separated from the cooled distillation vapor stream to produce a cold liquid reflux stream that is directed to the upper region of the absorbing section, where the cold liquids can contact the vapor portion of the expanded stream as described earlier. The vapor portion (if any) of the cooled distillation vapor stream and the overhead vapor from the absorbing section combine to form the residual methane and $C_2$ component product gas.

The separation that takes place in this process (producing a residue gas leaving the process which contains substantially all of the methane and $C_2$ components in the feed gas with essentially none of the $C_3$ components and heavier hydrocarbon components, and a bottoms fraction leaving the deethanizer which contains substantially all of the $C_3$ components and heavier hydrocarbon components with essentially no methane, $C_2$ components or more volatile components) consumes energy for feed gas cooling, for reboiling the deethanizing section, for refluxing the absorbing section, and/or for re-compressing the residue gas.

The present invention employs a novel means of performing the various steps described above more efficiently and using fewer pieces of equipment. This is accomplished by combining what heretofore have been individual equipment items into a common housing, thereby reducing the plot space required for the processing plant and reducing the capital cost of the facility. Surprisingly, applicants have found that the more compact arrangement also significantly reduces the power consumption required to achieve a given recovery level, thereby increasing the process efficiency and reducing the operating cost of the facility. In addition, the more compact arrangement also eliminates much of the piping used to interconnect the individual equipment items in traditional plant designs, further reducing capital cost and also eliminating the associated flanged piping connections. Since piping flanges are a potential leak source for hydrocarbons (which are volatile organic compounds, VOCs, that contribute to greenhouse gases and may also be precursors to atmospheric ozone formation), eliminating these flanges reduces the potential for atmospheric emissions that can damage the environment.

In accordance with the present invention, it has been found that $C_3$ recoveries in excess of 99.6% can be obtained while providing essentially complete rejection of $C_2$ components to the residue gas stream. In addition, the present invention makes possible essentially 100% separation of $C_2$ components and lighter components from the $C_3$ components and heavier components at lower energy requirements compared to the prior art while maintaining the same recovery level. The present invention, although applicable at lower pressures and warmer temperatures, is particularly advantageous when processing feed gases in the range of 400 to 1500 psia [2,758 to 10,342 kPa(a)] or higher under conditions requiring NGL recovery column overhead temperatures of −50° F. [−46° C.] or colder.

Figure 2:
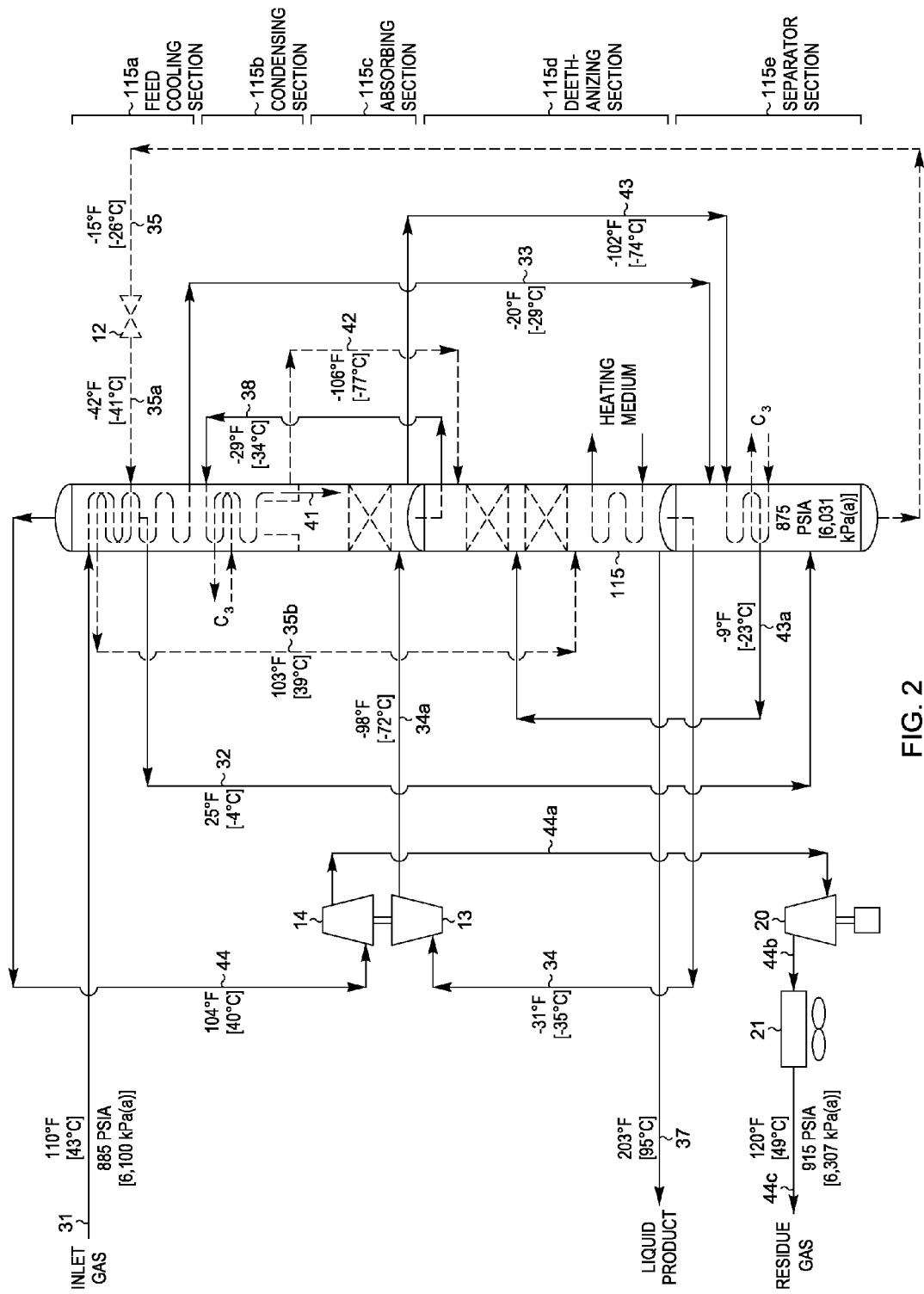
Figure 3:
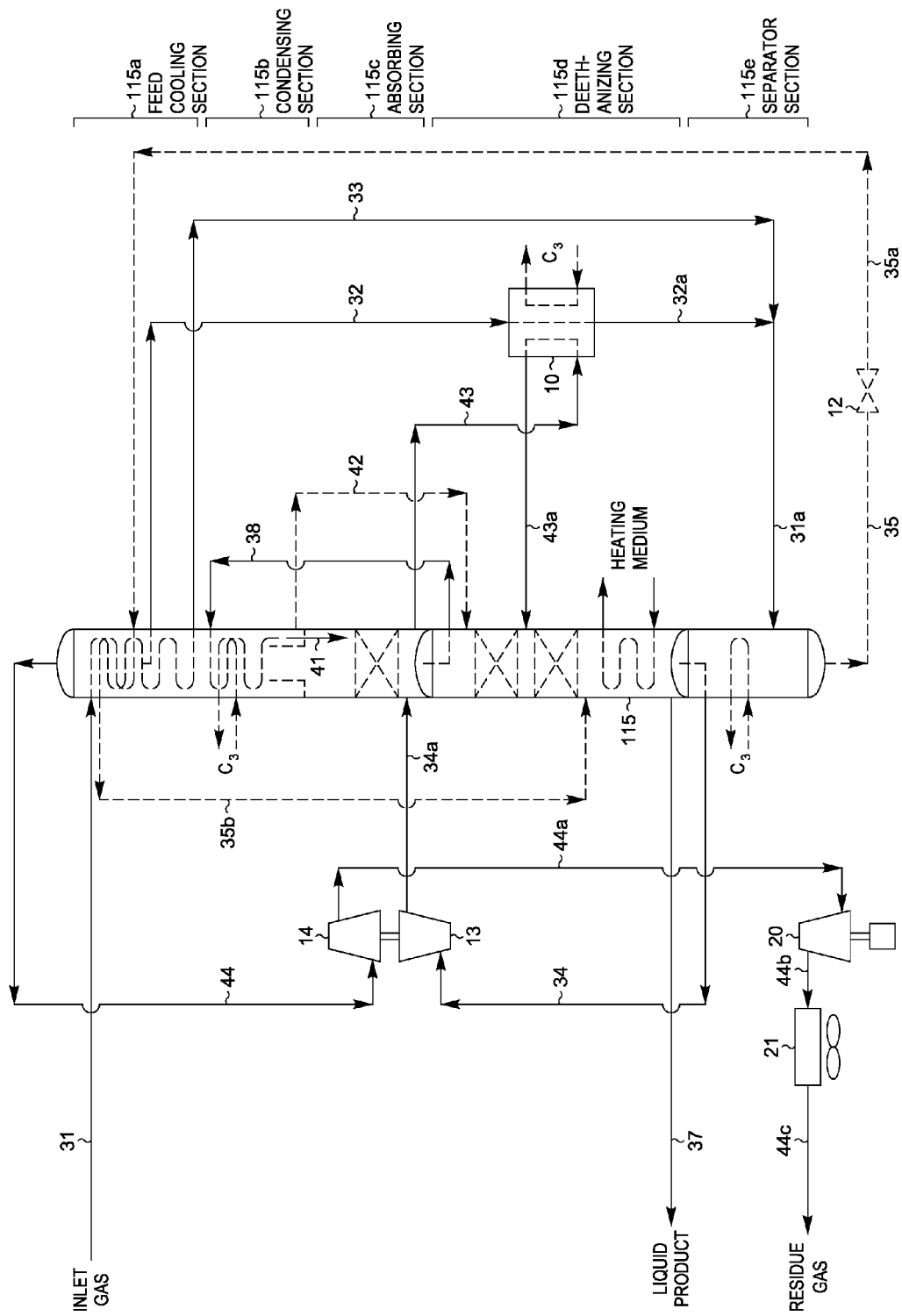
Figure 4:
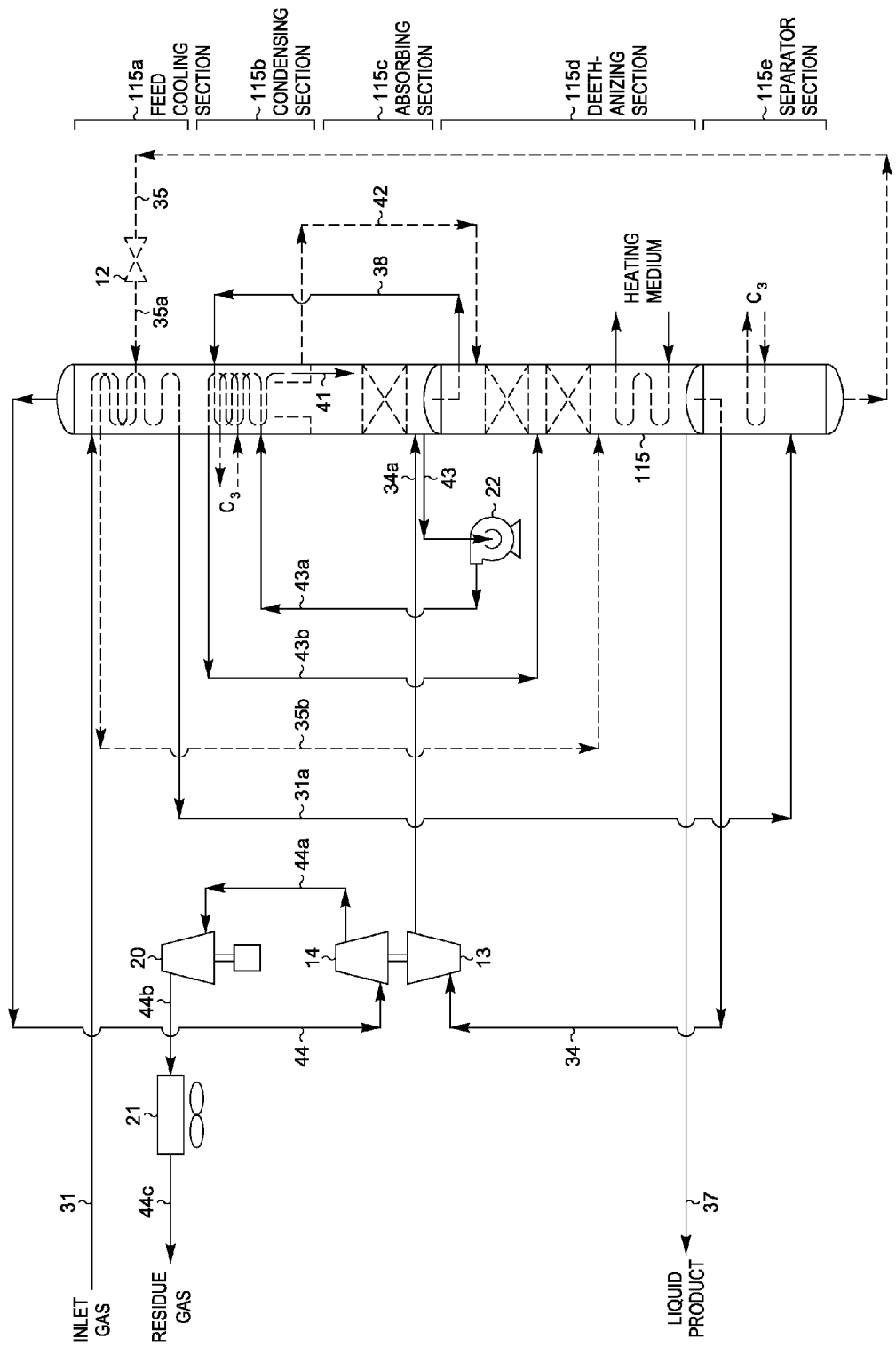
Figure 5:
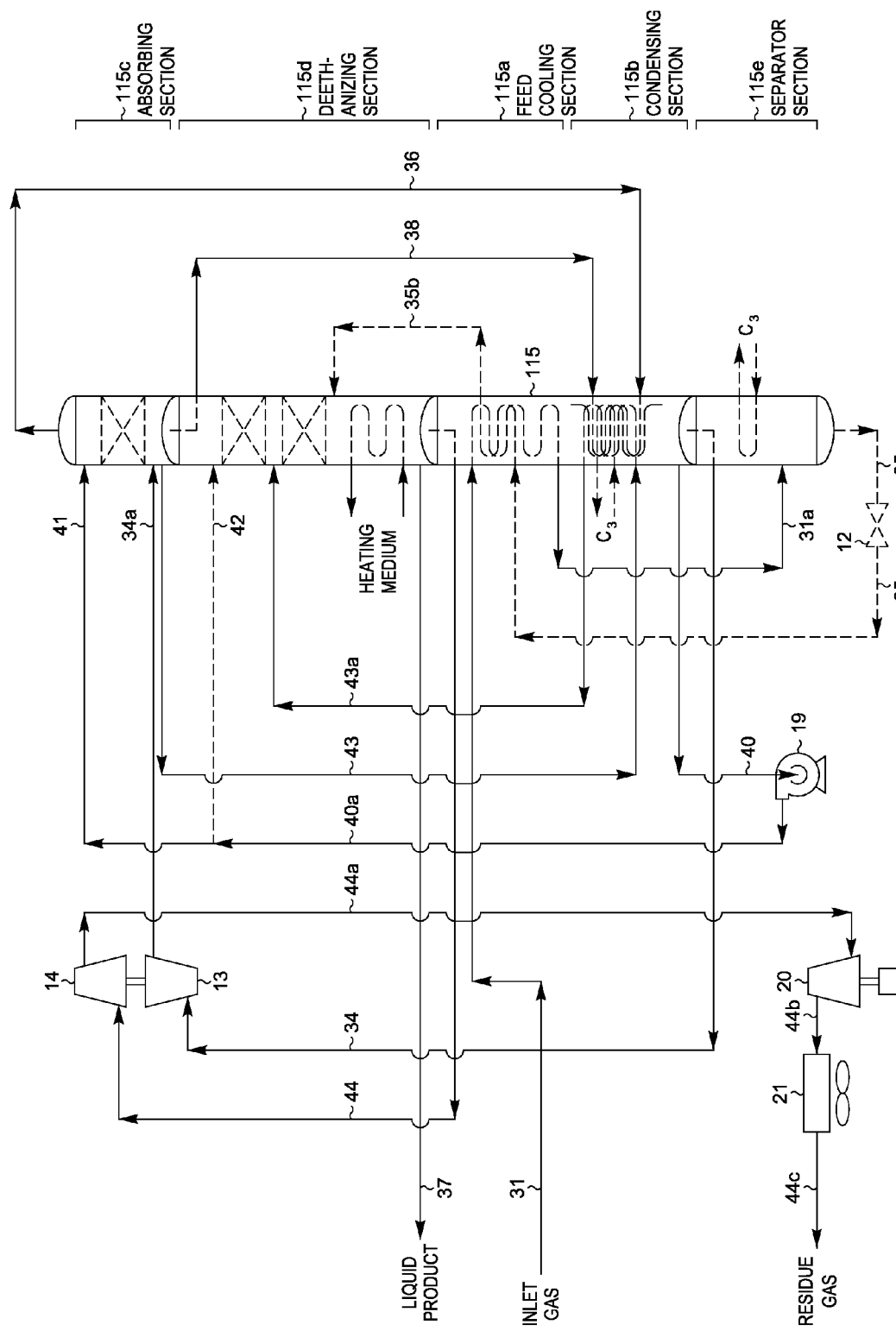
Figure 6:
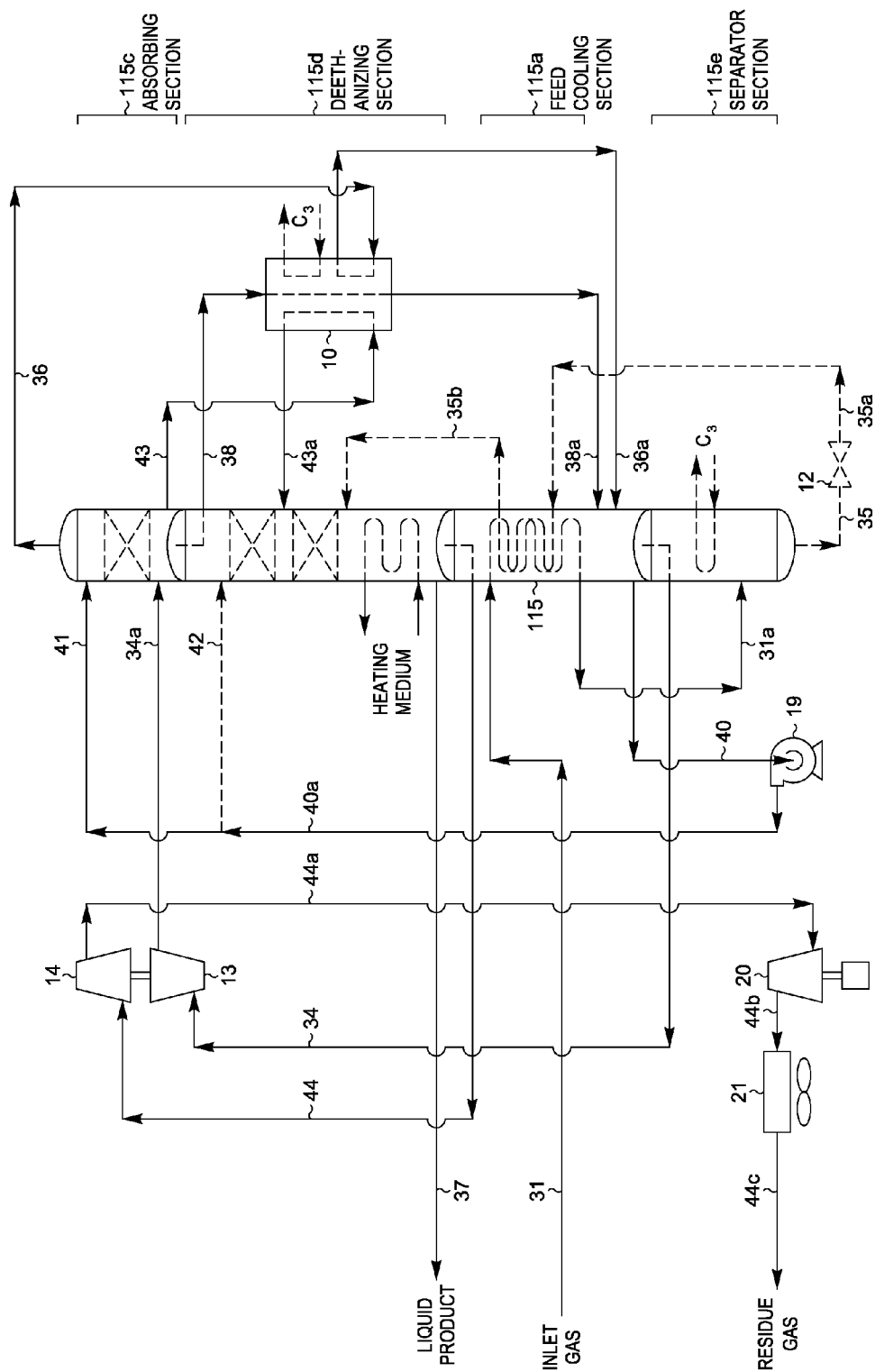
Figure 7:
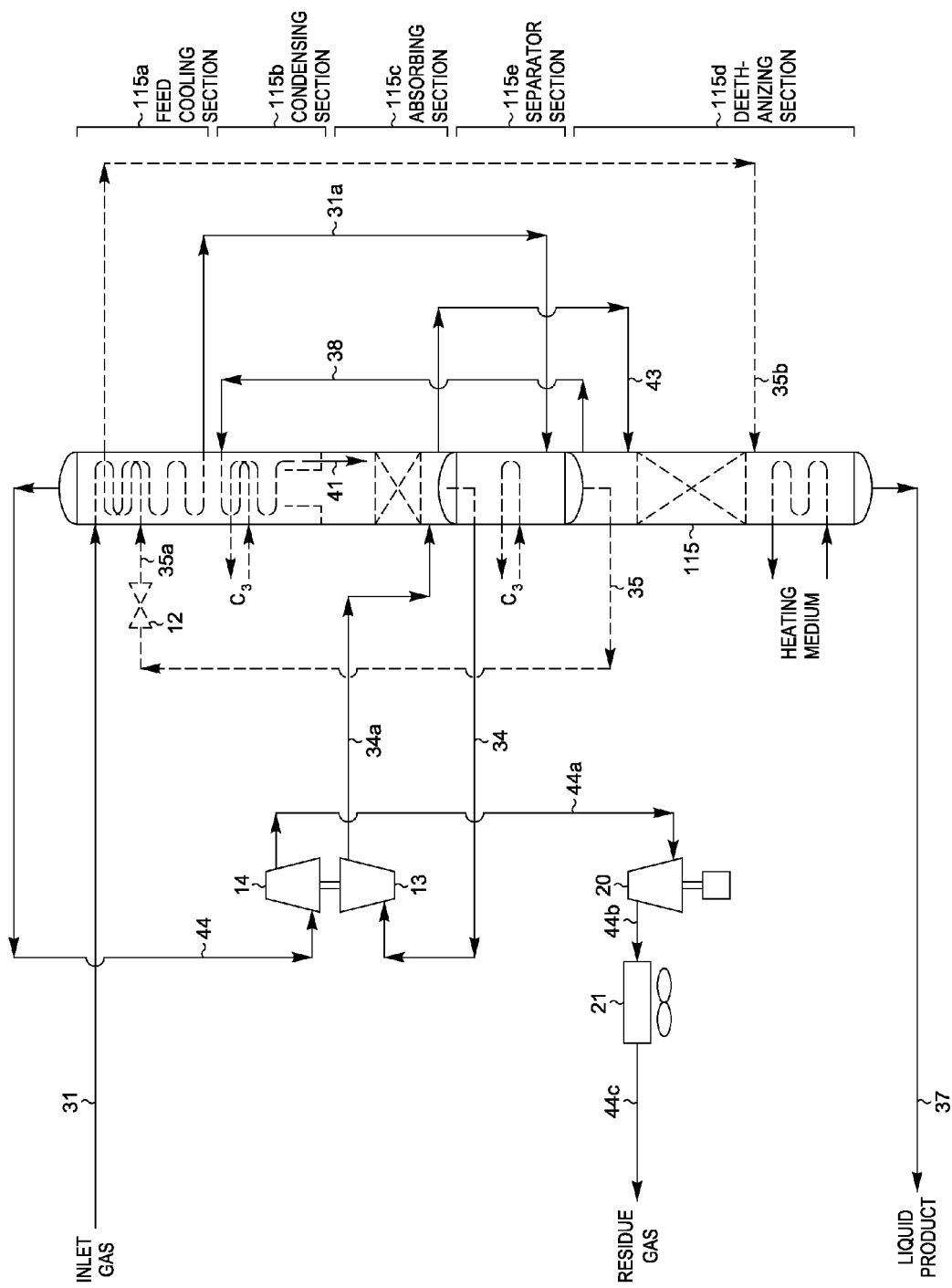

For a better understanding of the present invention, reference is made to the following examples and drawings. Referring to the drawings:

FIG. 1 is a flow diagram of a prior art natural gas processing plant in accordance with U.S. Pat. No. 5,799,507;

FIG. 2 is a flow diagram of a natural gas processing plant in accordance with the present invention; and FIGS. 3 through 21 are flow diagrams illustrating alternative means of application of the present invention to a natural gas stream.

In the following explanation of the above figures, tables are provided summarizing flow rates calculated for representative process conditions. In the tables appearing herein, the values for flow rates (in moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

For convenience, process parameters are reported in both the traditional British units and in the units of the Système International d'Unités (SI). The molar flow rates given in the tables may be interpreted as either pound moles per hour or kilogram moles per hour. The energy consumptions reported as horsepower (HP) and/or thousand British Thermal Units per hour (MBTU/Hr) correspond to the stated molar flow rates in pound moles per hour. The energy consumptions reported as kilowatts (kW) correspond to the stated molar flow rates in kilogram moles per hour.

DESCRIPTION OF THE PRIOR ART

FIG. 1 is a process flow diagram showing the design of a processing plant to recover $C_3$+ components from natural gas using prior art according to U.S. Pat. No. 5,799,507. In this simulation of the process, inlet gas enters the plant at 110° F. [43° C.] and 885 psia [6,100 kPa(a)] as stream 31. If the inlet gas contains a concentration of sulfur compounds which would prevent the product streams from meeting specifications, the sulfur compounds are removed by appropriate pretreatment of the feed gas (not illustrated). In addition, the feed stream is usually dehydrated to prevent hydrate (ice) formation under cryogenic conditions. Solid desiccant has typically been used for this purpose.

The feed stream 31 is cooled in heat exchanger 10 by heat exchange with cool residue gas (stream 44), flash expanded separator liquids (stream 35a), and distillation liquids at −105° F. [−76° C.] (stream 43). The cooled stream 31a enters separator 11 at −34° F. [−36° C.] and 875 psia [6,031 kPa(a)] where the vapor (stream 34) is separated from the condensed liquid (stream 35). The separator liquid (stream 35) is expanded to slightly above the operating pressure (approximately 375 psia [2,583 kPa(a)]) of fractionation tower 15 by expansion valve 12, cooling stream 35a to −65° F. [−54° C.]. Stream 35a enters heat exchanger 10 to supply cooling to the feed gas as described previously, heating stream 35b to 105° F. [41° C.] before it is supplied to fractionation tower 15 at a lower mid-column feed point.

The vapor (stream 34) from separator 11 enters a work expansion machine 13 in which mechanical energy is extracted from this portion of the high pressure feed. The machine 13 expands the vapor substantially isentropically to the operating pressure of fractionation tower 15, with the work expansion cooling the expanded stream 34a to a temperature of approximately −100° F. [−74° C.]. The typical commercially available expanders are capable of recovering on the order of 80-85% of the work theoretically available in an ideal isentropic expansion. The work recovered is often used to drive a centrifugal compressor (such as item 14) that can be used to re-compress the heated residue gas (stream 44a), for example. The partially condensed expanded stream 34a is thereafter supplied as feed to fractionation tower 15 at an upper mid-column feed point.

The deethanizer in tower 15 is a conventional distillation column containing a plurality of vertically spaced trays, one or more packed beds, or some combination of trays and packing. The deethanizer tower consists of two sections: an upper absorbing (rectification) section 15a that contains the trays and/or packing to provide the necessary contact between the vapor portion of the expanded stream 34a rising upward and cold liquid falling downward to condense and absorb the $C_3$ components and heavier components; and a lower stripping section 15b that contains the trays and/or packing to provide the necessary contact between the liquids falling downward and the vapors rising upward. The deethanizing section 15b also includes at least one reboiler (such as reboiler 16) which heats and vaporizes a portion of the liquids flowing down the column to provide the stripping vapors which flow up the column to strip the liquid product, stream 37, of methane, $C_2$ components, and lighter components.

Stream 34a enters deethanizer 15 at a mid-column feed position located in the lower region of absorbing section 15a of deethanizer 15. The liquid portion of expanded stream 34a commingles with liquids falling downward from absorbing section 15a and the combined liquid continues downward into stripping section 15b of deethanizer 15. The vapor portion of expanded stream 34a rises upward through absorbing section 15a and is contacted with cold liquid falling downward to condense and absorb the $C_3$ components and heavier components.

A portion of the distillation vapor (stream 38) is withdrawn from the upper region of stripping section 15b. This stream is then cooled and partially condensed (stream 38a) in exchanger 17 by heat exchange with cold deethanizer overhead stream 36 which exits the top of deethanizer 15 at −109° F. [−79° C.]. The cold deethanizer overhead stream is warmed to approximately −33° F. [−66° C.] (stream 36a) as it cools stream 38 from −30° F. [−35° C.] to about −103° F. [−75° C.] (stream 38a).

The operating pressure in reflux separator 18 is maintained slightly below the operating pressure of deethanizer 15. This pressure difference provides the driving force that allows distillation vapor stream 38 to flow through heat exchanger 17 and thence into the reflux separator 18 wherein the condensed liquid (stream 40) is separated from the uncondensed vapor (stream 39). The uncondensed vapor stream 39 combines with the warmed deethanizer overhead stream 36a from exchanger 17 to form cool residue gas stream 44 at −37° F. [−38° C.].

The liquid stream 40 from reflux separator 18 is pumped by pump 19 to a pressure slightly above the operating pressure of deethanizer 15. The resulting stream 40a is then divided into two portions. The first portion (stream 41) is supplied as cold top column feed (reflux) to the upper region of absorbing section 15a of deethanizer 15. This cold liquid causes an absorption cooling effect to occur inside the absorbing (rectification) section 15a of deethanizer 15, wherein the saturation of the vapors rising upward through the tower by vaporization of liquid methane and ethane contained in stream 41 provides refrigeration to the section. Note that, as a result, both the vapor leaving the upper region (overhead stream 36) and the liquids leaving the lower region (distillation liquid stream 43) of absorbing section 15a are colder than the either of the feed streams (streams 41 and stream 34a) to absorbing section 15a. This absorption cooling effect allows the tower overhead (stream 36) to provide the cooling needed in heat exchanger 17 to partially condense the distillation vapor stream (stream 38) without operating stripping section 15b at a pressure significantly higher than that of absorbing section 15a. This absorption cooling effect also facilitates reflux stream 41 condensing and absorbing the $C_3$ components and heavier components in the distillation vapor flowing upward through absorbing section 15a. The second portion (stream 42) of pumped stream 40a is supplied to the upper region of stripping section 15b of deethanizer 15 where the cold liquid acts as reflux to absorb and condense the $C_3$ components and heavier components flowing upward from below so that distillation vapor stream 38 contains minimal quantities of these components.

A distillation liquid stream 43 from deethanizer 15 is withdrawn from the lower region of absorbing section 15a and is routed to heat exchanger 10 where it is heated as it provides cooling of the incoming feed gas as described earlier. Typically the flow of this liquid from the deethanizer is via thermosiphon circulation, but a pump could be used. The liquid stream is heated to −4° F. [−20° C.], partially vaporizing stream 43a before it is returned as a mid-column feed to deethanizer 15, in the middle region of stripping section 15b.

In stripping section 15b of deethanizer 15, the feed streams are stripped of their methane and $C_2$ components. The resulting liquid product stream 37 exits the bottom of the tower at 201° F. [94° C.] based on a typical specification of an ethane to propane ratio of 0.048:1 on a molar basis in the bottom product. The cool residue gas (stream 44) passes countercurrently to the incoming feed gas in heat exchanger 10 where it is heated to 98° F. [37° C.] (stream 44a). The residue gas is then re-compressed in two stages. The first stage is compressor 14 driven by expansion machine 13. The second stage is compressor 20 driven by a supplemental power source which compresses the residue gas (stream 44c) to sales line pressure. After cooling to 120° F. [49° C.] in discharge cooler 21, residue gas stream 44d flows to the sales gas pipeline at 915 psia [6,307 kPa(a)], sufficient to meet line requirements (usually on the order of the inlet pressure).

A summary of stream flow rates and energy consumption for the process illustrated in FIG. 1 is set forth in the following table:

TABLE I (FIG. 1)
Stream Flow Summary - Lb. Moles/Hr [kg moles/Hr]

| Stream | Methane | Ethane | Propane | Butanes+ | Total |
|---|---|---|---|---|---|
| 31 | 19,419 | 1,355 | 565 | 387 | 21,961 |
| 34 | 18,742 | 1,149 | 360 | 98 | 20,573 |
| 35 | 677 | 206 | 205 | 289 | 1,388 |
| 36 | 18,400 | 1,242 | 3 | 0 | 19,869 |
| 38 | 2,759 | 1,758 | 15 | 0 | 4,602 |
| 39 | 1,019 | 86 | 0 | 0 | 1,116 |
| 40 | 1,740 | 1,672 | 15 | 0 | 3,486 |
| 41 | 1,044 | 1,003 | 9 | 0 | 2,092 |
| 42 | 696 | 669 | 6 | 0 | 1,394 |
| 43 | 1,388 | 911 | 365 | 98 | 2,796 |
| 44 | 19,419 | 1,328 | 3 | 0 | 20,985 |
| 37 | 0 | 27 | 562 | 387 | 976 |

| Recoveries* | | |
|---|---|---|
| Propane | 99.56% | |
| Butanes+ | 100.00% | |
| Power | | |
| Residue Gas Compression | 9,868 HP | [16,223 kW] |
| Reflux Pump | 19 HP | [31 kW] |
| Totals | 9,887 HP | [16,254 kW] |

*(Based on un-rounded flow rates)

DESCRIPTION OF THE INVENTION

FIG. 2 illustrates a flow diagram of a process in accordance with the present invention. The feed gas composition and conditions considered in the process presented in FIG. 2 are the same as those in FIG. 1. Accordingly, the FIG. 2 process can be compared with that of the FIG. 1 process to illustrate the advantages of the present invention.

In the simulation of the FIG. 2 process, inlet gas enters the plant as stream 31 and enters a heat exchange means in feed cooling section 115a inside processing assembly 115. This heat exchange means may be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 31 flowing through one pass of the heat exchange means and flash expanded separator liquids (stream 35a) and a residue gas stream from condensing section 115b inside processing assembly 115. Stream 31 is cooled while heating the flash expanded separator liquids and the residue gas stream. A first portion (stream 32) of stream 31 is withdrawn from the heat exchange means after stream 31 has been partially cooled to 25° F. [−4° C.], while the remaining second portion (stream 33) is further cooled so that it leaves the heat exchange means at −20° F. [−29° C.].

Separator section 115e has an internal head or other means to divide it from deethanizing section 115d, so that the two sections inside processing assembly 115 can operate at different pressures. The first portion (stream 32) of stream 31 enters the lower region of separator section 115e at 875 psia [6,031 kPa(a)] where any condensed liquid is separated from the vapor before the vapor is directed into a heat and mass transfer means inside separator section 115e. This heat and mass transfer means may also be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between the vapor portion of stream 32 flowing upward through one pass of the heat and mass transfer means and distillation liquid stream 43 from absorbing section 115c inside processing assembly 115 flowing downward, so that the vapor is cooled while heating the distillation liquid stream. As the vapor stream is cooled, a portion of it may be condensed and fall downward while the remaining vapor continues flowing upward through the heat and mass transfer means. The heat and mass transfer means provides continuous contact between the condensed liquid and the vapor so that it also functions to provide mass transfer between the vapor and liquid phases to provide partial rectification of the vapor.

The second portion (stream 33) of stream 31 enters separator section 115e inside processing assembly 115 above the heat and mass transfer means. Any condensed liquid is separated from the vapor and comingles with any liquid that is condensed from the vapor portion of stream 32 flowing up through the heat and mass transfer means. The vapor portion of stream 33 combines with the vapor leaving the heat and mass transfer means to form stream 34, which exits separator section 115e at −31° F. [−35° C.]. The liquid portions (if any) of streams 32 and 33 and any liquid condensed from the vapor portion of stream 32 in the heat and mass transfer means combine to form stream 35, which exits separator section 115e at −15° F. [−26° C.]. It is expanded to slightly above the operating pressure (approximately 383 psia [2,639 kPa(a)]) of deethanizing section 115d inside processing assembly 115 by expansion valve 12, cooling stream 35a to −42° F. [−41° C.]. Stream 35a enters the heat exchange means in feed cooling section 115a to supply cooling to the feed gas as described previously, heating stream 35b to 103° F. [39° C.] before it is supplied to deethanizing section 115d inside processing assembly 115 at a lower mid-column feed point.

The vapor (stream 34) from separator section 115e enters a work expansion machine 13 in which mechanical energy is extracted from this portion of the high pressure feed. The machine 13 expands the vapor substantially isentropically to the operating pressure (approximately 380 psia [2,618 kPa(a)]) of absorbing section 115c, with the work expansion cooling the expanded stream 34a to a temperature of approximately −98° F. [−72° C.]. The partially condensed expanded stream 34a is thereafter supplied as feed to the lower region of absorbing section 115c inside processing assembly 115.

Absorbing section 115c contains an absorbing means consisting of a plurality of vertically spaced trays, one or more packed beds, or some combination of trays and packing. The trays and/or packing in absorbing section 115c provide the necessary contact between the vapors rising upward and cold liquid falling downward. The vapor portion of expanded stream 34a rises upward through the absorbing means in absorbing section 115c to be contacted with the cold liquid falling downward to condense and absorb most of the $C_3$ components and heavier components from these vapors. The liquid portion of expanded stream 34a comingles with liquids falling downward from the absorbing means in absorbing section 115c to form distillation liquid stream 43, which is withdraw from the lower region of absorbing section 115c at −102° F. [−74° C.]. The distillation liquid is heated to −9° F. [−23° C.] as it cools the vapor portion of stream 32 in separator section 115e as described previously, with the heated distillation liquid stream 43a thereafter supplied to deethanizing section 115d inside processing assembly 115 at an upper mid-column feed point. Typically the flow of this liquid from absorbing section 115c through the heat and mass transfer means in separator section 115e to deethanizing section 115d is via thermosiphon circulation, but a pump could be used.

Absorbing section 115c has an internal head or other means to divide it from deethanizing section 115d, so that the two sections inside processing assembly 115 can operate with the pressure of deethanizing section 115d slightly higher than that of absorbing section 115c. This pressure difference provides the driving force that allows a first distillation vapor stream (stream 38) to be withdrawn from the upper region of deethanizing section 115d and directed to the heat exchange means in condensing section 115b inside processing assembly 115. This heat exchange means may likewise be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between first distillation vapor stream 38 flowing through one pass of the heat exchange means and a second distillation vapor stream arising from absorbing section 115c inside processing assembly 115. The second distillation vapor stream is heated while it cools and at least partially condenses stream 38, which thereafter exits the heat exchange means and is separated into its respective vapor and liquid phases. The vapor phase (if any) combines with the heated second distillation vapor stream exiting the heat exchange means to form the residue gas stream that provides cooling in feed cooling section 115a as described previously. The liquid phase is divided into two portions, streams 41 and 42.

The first portion (stream 41) is supplied as cold top column feed (reflux) to the upper region of absorbing section 115c inside processing assembly 115 by gravity flow. This cold liquid causes an absorption cooling effect to occur inside absorbing (rectification) section 115a, wherein the saturation of the vapors rising upward through the tower by vaporization of liquid methane and ethane contained in stream 41 provides refrigeration to the section. This absorption cooling effect allows the second distillation vapor stream to provide the cooling needed in the heat exchange means in condensing section 115b to partially condense the first distillation vapor stream (stream 38) without operating deethanizing section 115d at a pressure significantly higher than that of absorbing section 115c. This absorption cooling effect also facilitates reflux stream 41 condensing and absorbing the $C_3$ components and heavier components in the distillation vapor flowing upward through absorbing section 115c. The second portion (stream 42) of the liquid phase separated in condensing section 115b is supplied as cold top column feed (reflux) to the upper region of deethanizing section 115d inside processing assembly 115 by gravity flow, so that the cold liquid acts as reflux to absorb and condense the $C_3$ components and heavier components flowing upward from below so that distillation vapor stream 38 contains minimal quantities of these components.

Deethanizing section 115d inside processing assembly 115 contains a mass transfer means consisting of a plurality of vertically spaced trays, one or more packed beds, or some combination of trays and packing. The trays and/or packing in deethanizing section 115d provide the necessary contact between the vapors rising upward and cold liquid falling downward. Deethanizing section 115d also includes a heat and mass transfer means beneath the mass transfer means. This heat and mass transfer means may also be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between a heating medium flowing through one pass of the heat and mass transfer means and a distillation liquid stream flowing downward from the mass transfer means in deethanizing section 115d, so that the distillation liquid stream is heated. As the distillation liquid stream is heated, a portion of it is vaporized to form stripping vapors that rise upward as the remaining liquid continues flowing downward through the heat and mass transfer means. The heat and mass transfer means provides continuous contact between the stripping vapors and the distillation liquid stream so that it also functions to provide mass transfer between the vapor and liquid phases, stripping the liquid product stream 37 of methane, $C_2$ components, and lighter components. The resulting liquid product (stream 37) exits the lower region of deethanizing section 115d and leaves processing assembly 115 at 203° F. [95° C.].

The second distillation vapor stream arising from absorbing section 115c is warmed in condensing section 115b as it provides cooling to stream 38 as described previously. The warmed second distillation vapor stream combines with any vapor separated from the cooled first distillation vapor stream 38 as described previously. The resulting residue gas stream is heated in feed cooling section 115a as it provides cooling to stream 31 as described previously, whereupon residue gas stream 44 leaves processing assembly 115 at 104° F. [40° C.]. The residue gas stream is then re-compressed in two stages, compressor 14 driven by expansion machine 13 and compressor 20 driven by a supplemental power source. After cooling to 120° F. [49° C.] in discharge cooler 21, residue gas stream 44c flows to the sales gas pipeline at 915 psia [6,307 kPa(a)], sufficient to meet line requirements (usually on the order of the inlet pressure).

A summary of stream flow rates and energy consumption for the process illustrated in FIG. 2 is set forth in the following table:

TABLE II (FIG. 2)
Stream Flow Summary - Lb. Moles/Hr [kg moles/Hr]

| Stream | Methane | Ethane | Propane | Butanes+ | Total |
|---|---|---|---|---|---|
| 31 | 19,419 | 1,355 | 565 | 387 | 21,961 |
| 32 | 4,855 | 339 | 141 | 97 | 5,490 |

TABLE II-continued (FIG. 2)
Stream Flow Summary - Lb. Moles/Hr [kg moles/Hr]

| | | | | | |
|---|---|---|---|---|---|
| 33 | 14,564 | 1,016 | 424 | 290 | 16,471 |
| 34 | 18,870 | 1,135 | 348 | 104 | 20,683 |
| 35 | 549 | 220 | 217 | 283 | 1,278 |
| 38 | 2,398 | 1,544 | 13 | 0 | 4,015 |
| 41 | 1,018 | 868 | 8 | 0 | 1,924 |
| 42 | 737 | 628 | 5 | 0 | 1,394 |
| 43 | 1,112 | 723 | 353 | 104 | 2,320 |
| 44 | 19,419 | 1,328 | 3 | 0 | 20,984 |
| 37 | 0 | 27 | 562 | 387 | 977 |

| Recoveries* | | | | |
|---|---|---|---|---|
| Propane | | 99.63% | | |
| Butanes+ | | 100.00% | | |
| Power | | | | |
| Residue Gas Compression | | 9,363 HP | | [15,393 kW] |

*(Based on un-rounded flow rates)

A comparison of Tables I and II shows that the present invention maintains essentially the same recoveries as the prior art. However, further comparison of Tables I and II shows that the product yields were achieved using significantly less power than the prior art. In terms of the recovery efficiency (defined by the quantity of propane recovered per unit of power), the present invention represents more than a 5% improvement over the prior art of the FIG. 1 process.

The improvement in recovery efficiency provided by the present invention over that of the prior art of the FIG. 1 process is primarily due to three factors. First, the compact arrangement of the heat exchange means in feed cooling section 115a and condensing section 115b in processing assembly 115 eliminates the pressure drop imposed by the interconnecting piping found in conventional processing plants. The result is that the residue gas flowing to compressor 14 is at higher pressure for the present invention compared to the prior art, so that the residue gas entering compressor 20 is at significantly higher pressure, thereby reducing the power required by the present invention to restore the residue gas to pipeline pressure.

Second, using the heat and mass transfer means in deethanizing section 115d to simultaneously heat the distillation liquid leaving the mass transfer means in deethanizing section 115d while allowing the resulting vapors to contact the liquid and strip its volatile components is more efficient than using a conventional distillation column with external reboilers. The volatile components are stripped out of the liquid continuously, reducing the concentration of the volatile components in the stripping vapors more quickly and thereby improving the stripping efficiency for the present invention.

Third, using the heat and mass transfer means in separator section 115e to simultaneously cool the vapor portion of stream 32 while condensing the heavier hydrocarbon components from the vapor provides partial rectification of stream 34 before it is subsequently expanded and supplied as feed to absorbing section 115c. As a result, less reflux flow (stream 41) is required to rectify the expanded stream 34a to remove the $C_3$ components and heavier hydrocarbon components from it, as seen by comparing the flow rate of stream 41 in Tables I and II.

The present invention offers two other advantages over the prior art in addition to the increase in processing efficiency. First, the compact arrangement of processing assembly 115 of the present invention replaces six separate equipment items in the prior art (heat exchangers 10 and 17, separator 11, reflux separator 18, reflux pump 19, and fractionation tower 15 in FIG. 1) with a single equipment item (processing assembly 115 in FIG. 2). This reduces the plot space requirements, eliminates the interconnecting piping, and eliminates the power consumed by the reflux pump, reducing the capital cost and operating cost of a process plant utilizing the present invention over that of the prior art. Second, elimination of the interconnecting piping means that a processing plant utilizing the present invention has far fewer flanged connections compared to the prior art, reducing the number of potential leak sources in the plant. Hydrocarbons are volatile organic compounds (VOCs), some of which are classified as greenhouse gases and some of which may be precursors to atmospheric ozone formation, which means the present invention reduces the potential for atmospheric releases that can damage the environment.

Other Embodiments

Some circumstances may favor eliminating feed cooling section 115*a* and condensing section 115*b* from processing assembly 115, and using one or more heat exchange means external to the processing assembly for feed cooling and reflux condensing, such as heat exchangers 23 and 17 shown in FIGS. 14 through 21. Such an arrangement allows processing assembly 115 to be smaller, which may reduce the overall plant cost and/or shorten the fabrication schedule in some cases. Note that in all cases exchangers 23 and 17 are representative of either a multitude of individual heat exchangers or a single multi-pass heat exchanger, or any combination thereof. Each such heat exchanger may be comprised of a fin and tube type heat exchanger, a plate type heat exchanger, a brazed aluminum type heat exchanger, or other type of heat transfer device, including multi-pass and/or multi-service heat exchangers. In some cases, it may be advantageous to combine the feed cooling and reflux condensing in a single multi-service heat exchanger. With heat exchanger 17 external to the processing assembly, reflux separator 18 and pump 19 will typically be needed to separate condensed liquid stream 40 and deliver at least a portion of it to absorbing section 115*c* as reflux.

As described earlier for the embodiment of the present invention shown in FIG. 2, the first distillation vapor stream 38 is partially condensed and the resulting condensate used to absorb valuable $C_3$ components and heavier components from the vapors leaving the work expansion machine. However, the present invention is not limited to this embodiment. It may be advantageous, for instance, to treat only a portion of the outlet vapor from the work expansion machine in this manner, or to use only a portion of the condensate as an absorbent, in cases where other design considerations indicate portions of the expansion machine outlet or the condensate should bypass absorbing section 115*c* of processing assembly 115. Feed gas conditions, plant size, available equipment, or other factors may indicate that elimination of work expansion machine 13, or replacement with an alternate expansion device (such as an expansion valve), is feasible, or that total (rather than partial) condensation of first distillation vapor stream 38 in condensing section 115*b* inside processing assembly 115 (FIGS. 2 through 13) or heat exchanger 17 (FIGS. 14 through 21) is possible or is preferred. It should also be noted that, depending on the composition of the feed gas stream, it may be advantageous to use external refrigeration to provide partial cooling of first distillation vapor stream 38 in condensing section 115*b* (FIGS. 2 through 13) or heat exchanger 17 (FIGS. 14 through 21).

Figure 8:
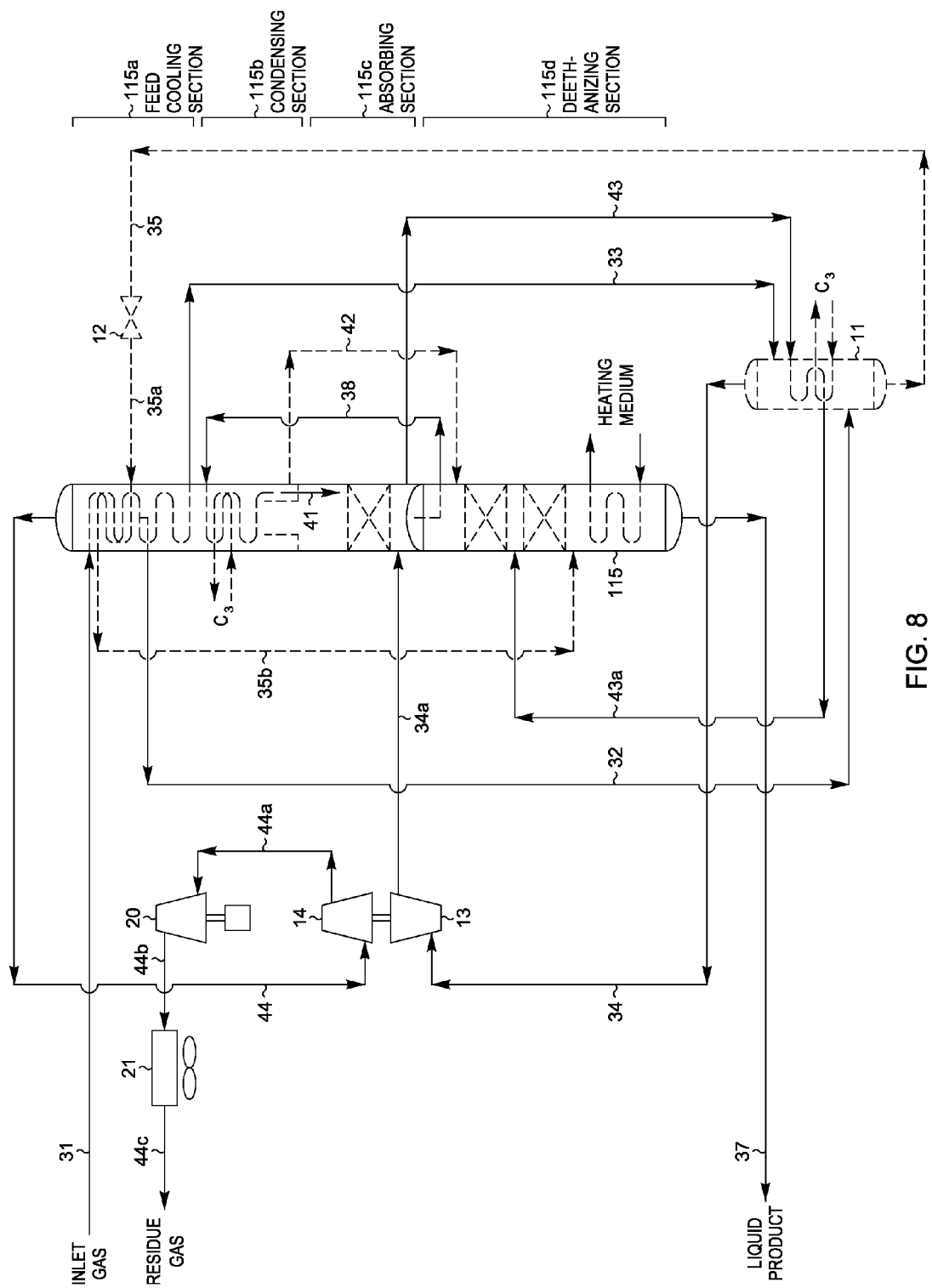
Figure 9:
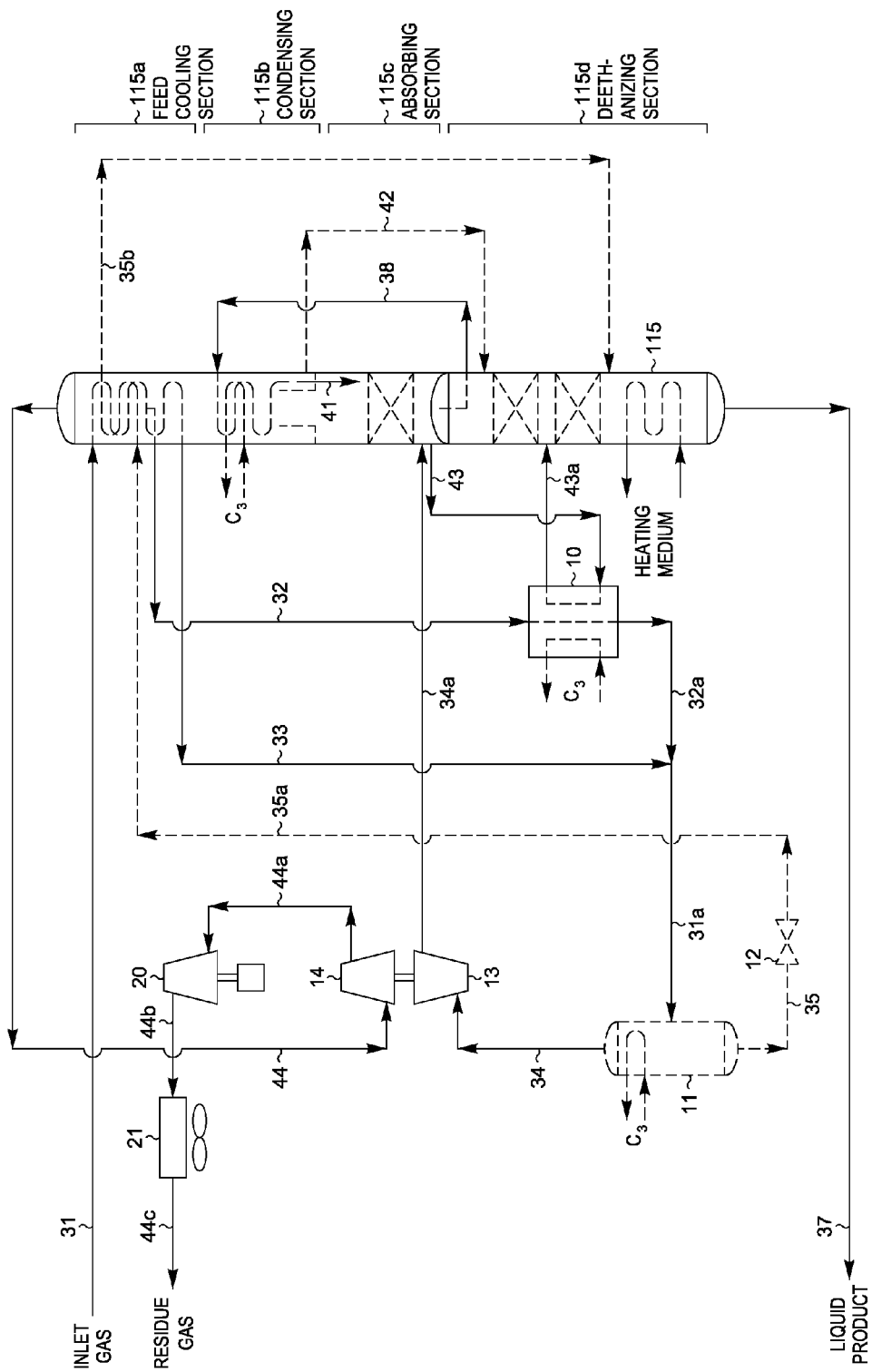
Figure 10:
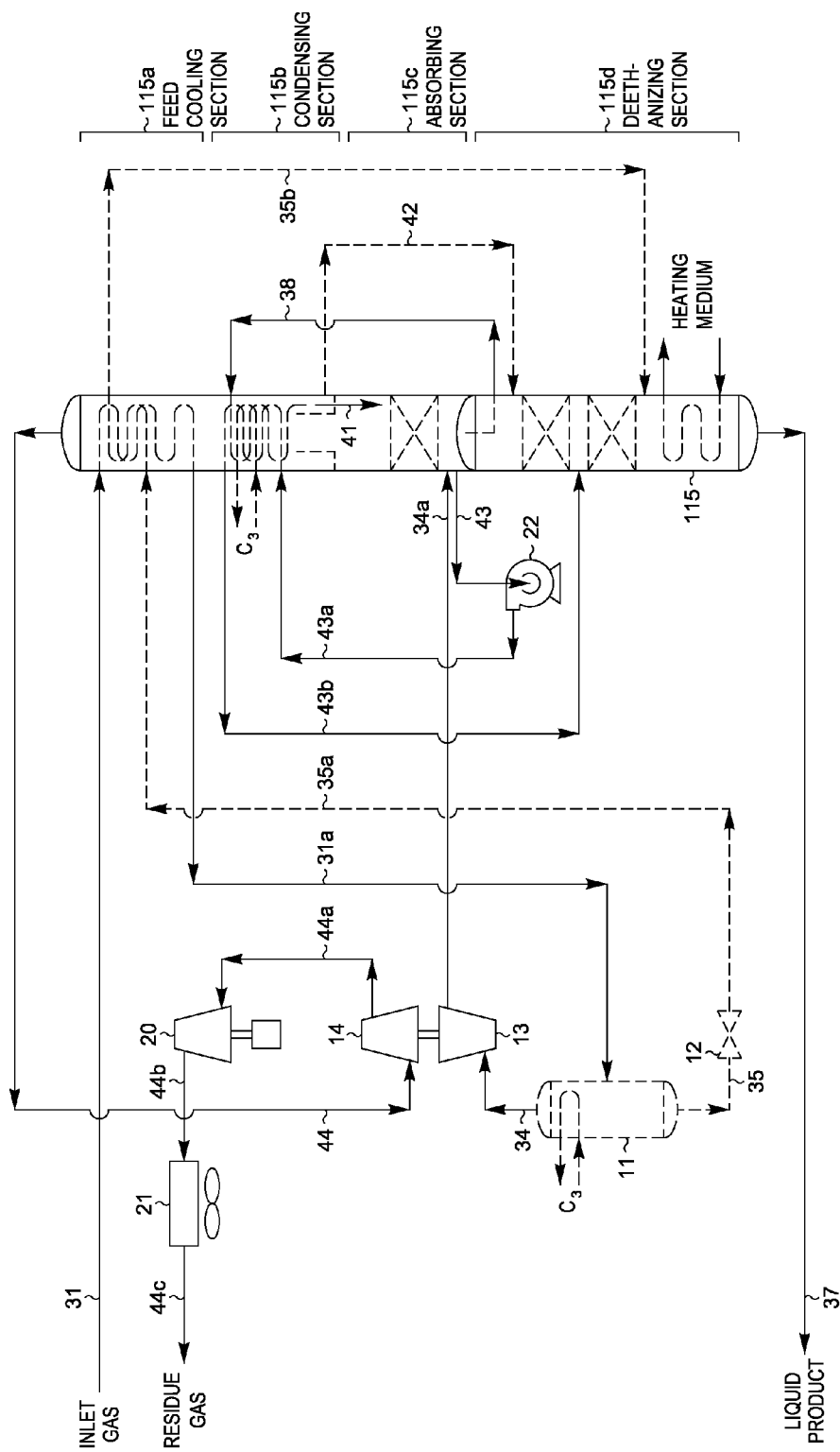
Figure 11:
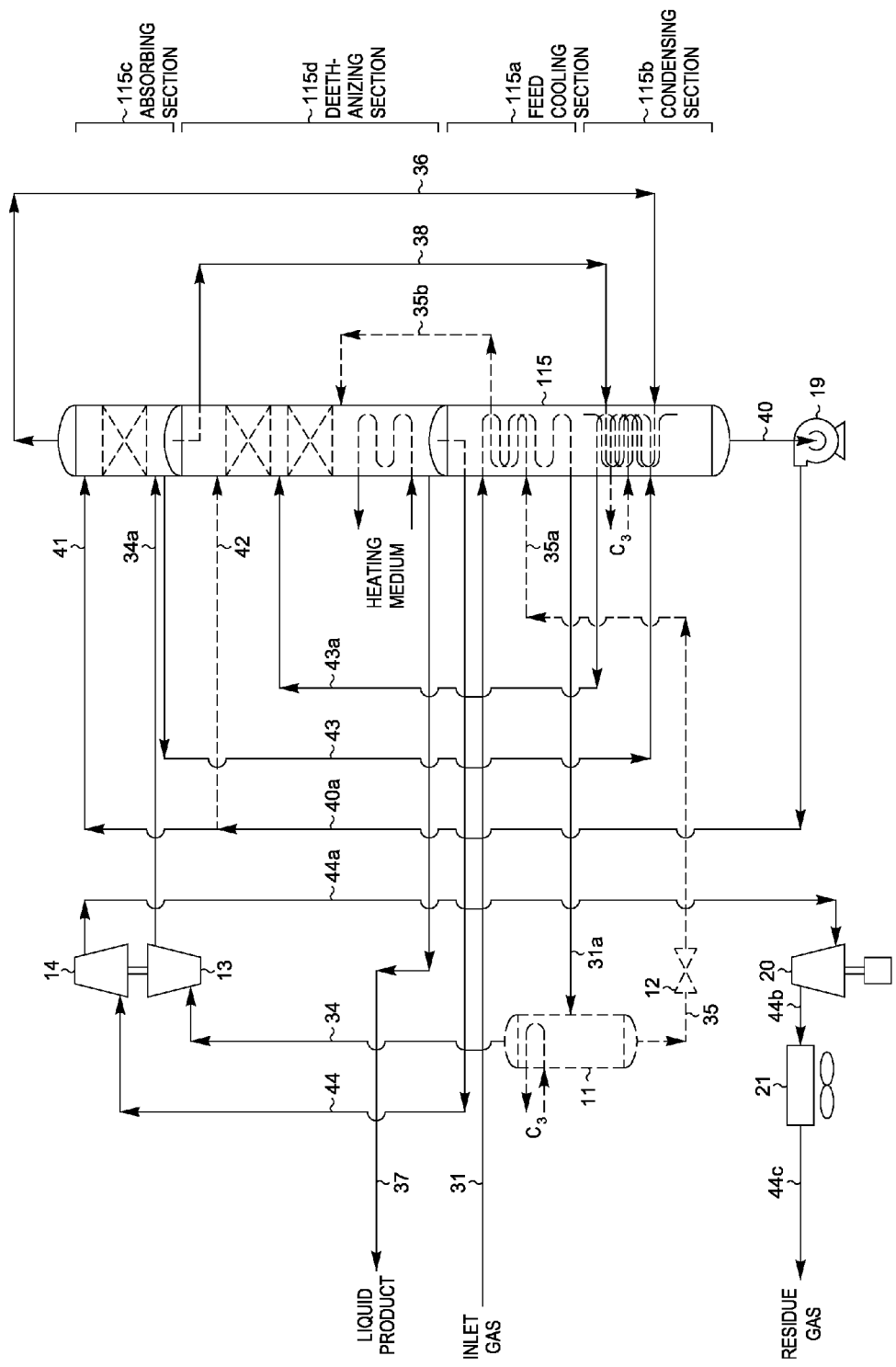
Figure 12:
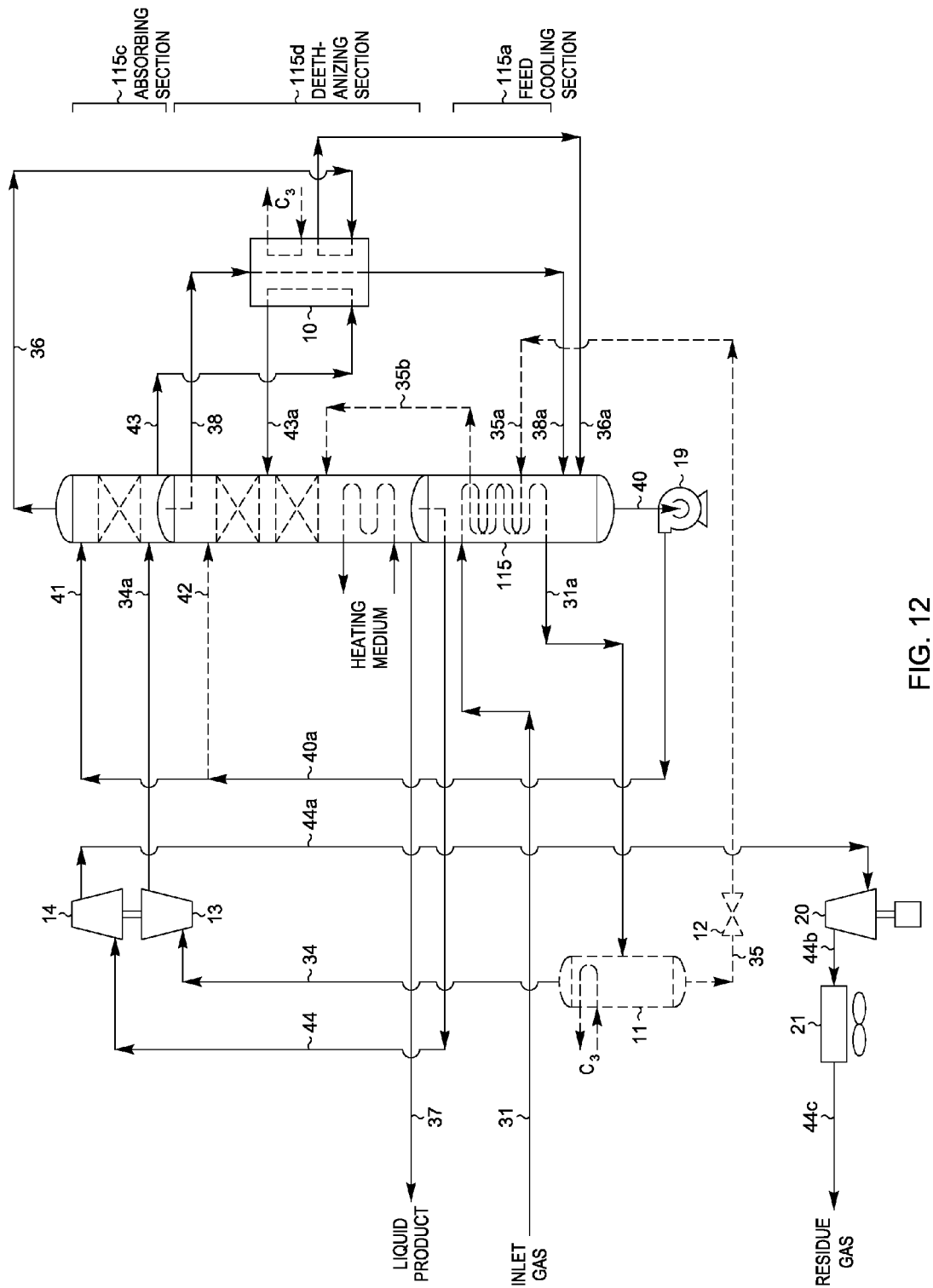
Figure 13:
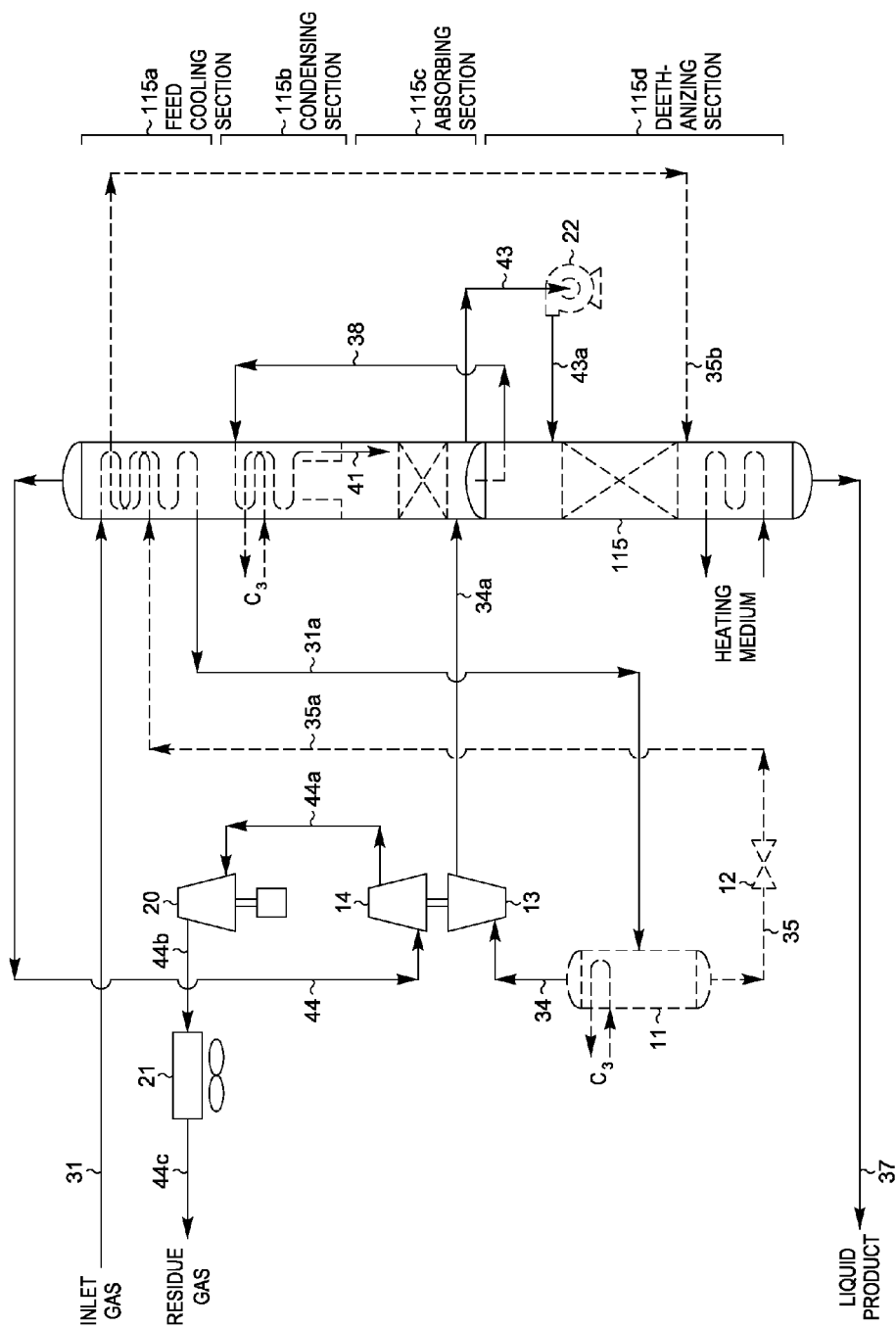
Figure 18:
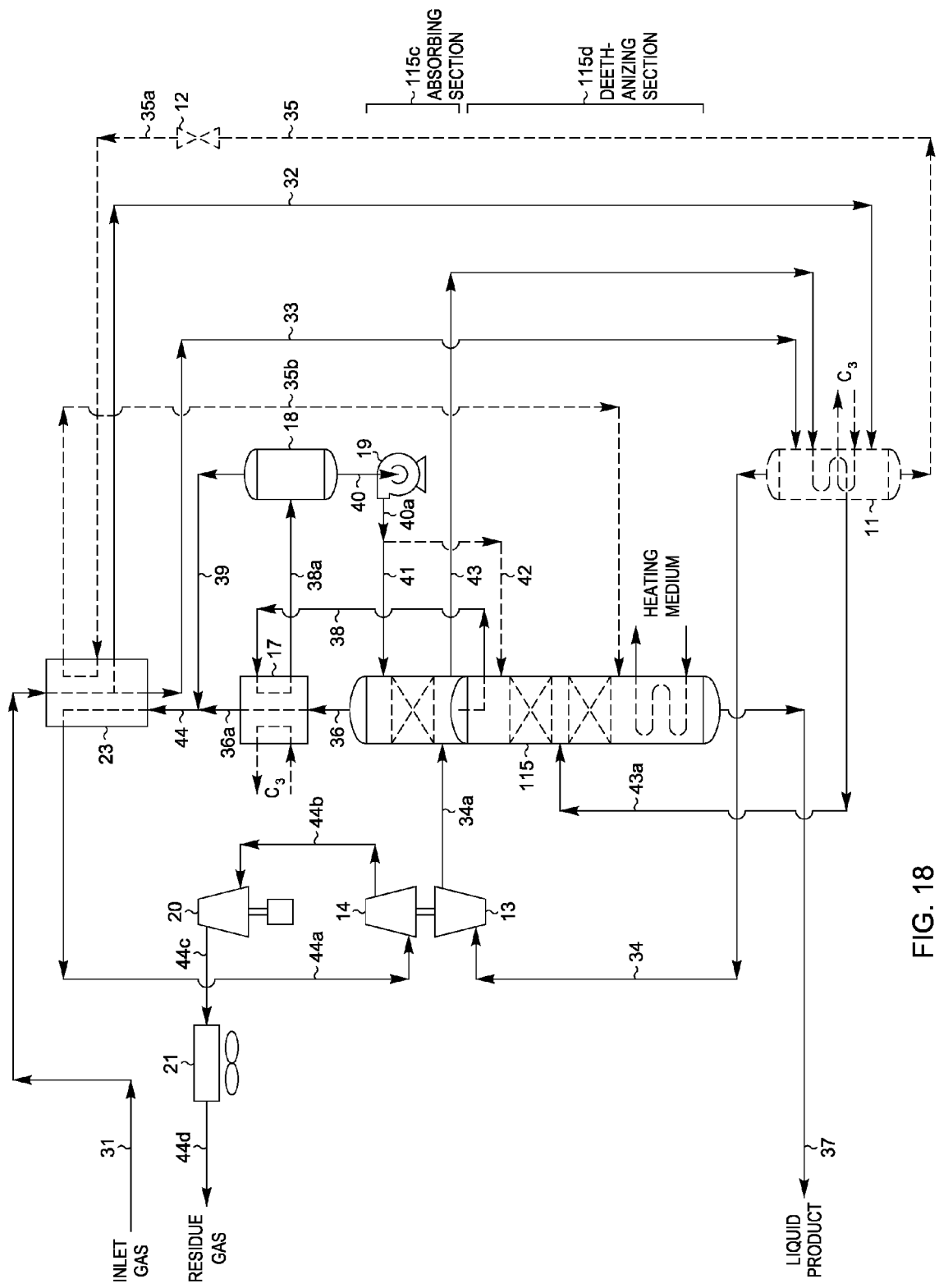
Figure 19:
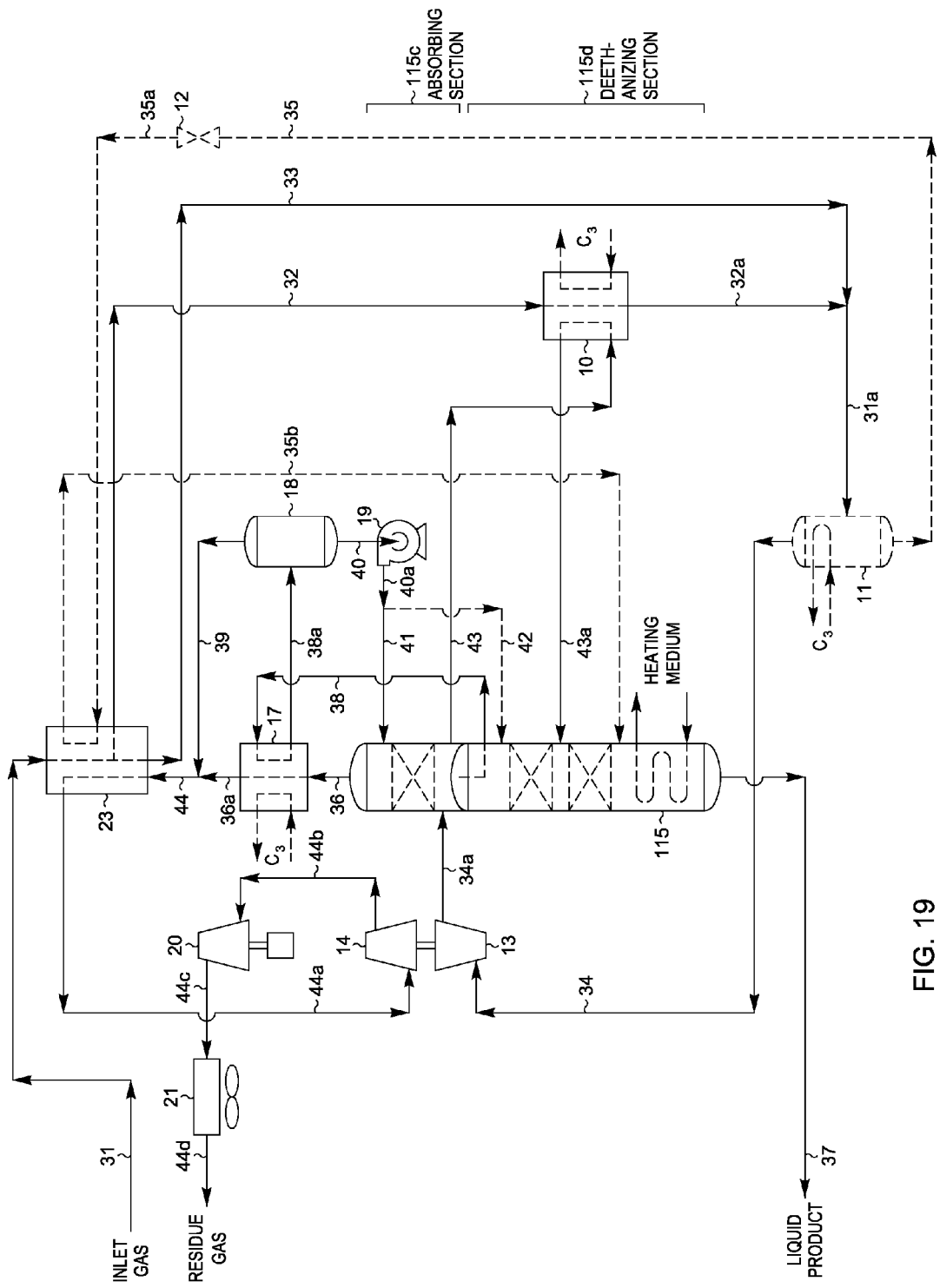

In some circumstances, it may be advantageous to use an external separator vessel to separate cooled first and second portions 32 and 33 or cooled feed stream 31*a*, rather than including separator section 115*e* in processing assembly 115. As shown in FIGS. 8 and 18, a heat and mass transfer means in separator 11 can be used to separate cooled first and second portions 32 and 33 into vapor stream 34 and liquid stream 35. Likewise, as shown in FIGS. 9 through 13 and 19 through 21, separator 11 can be used to separate cooled feed stream 31*a* into vapor stream 34 and liquid stream 35.

Figure 16:
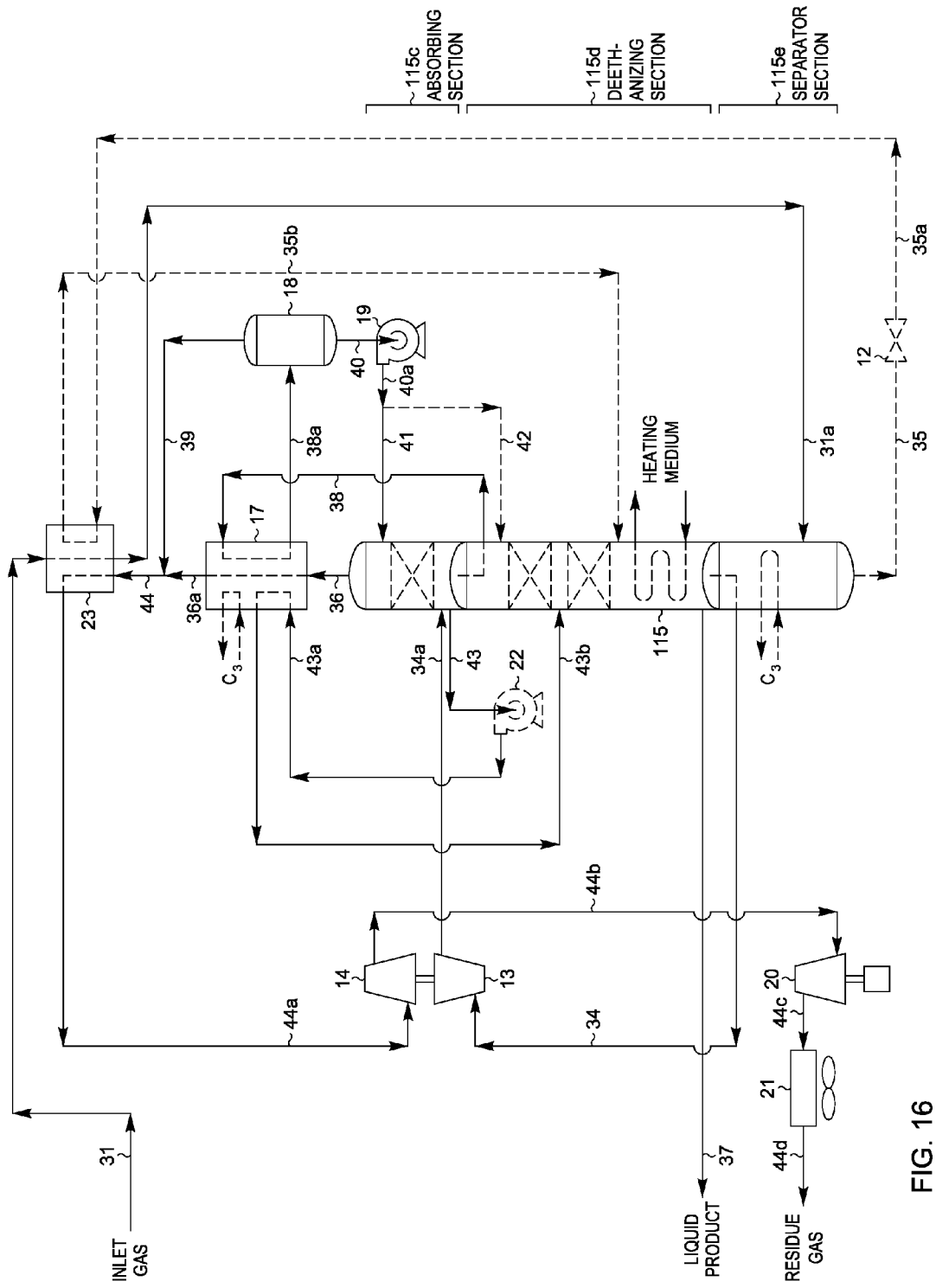
Figure 17:
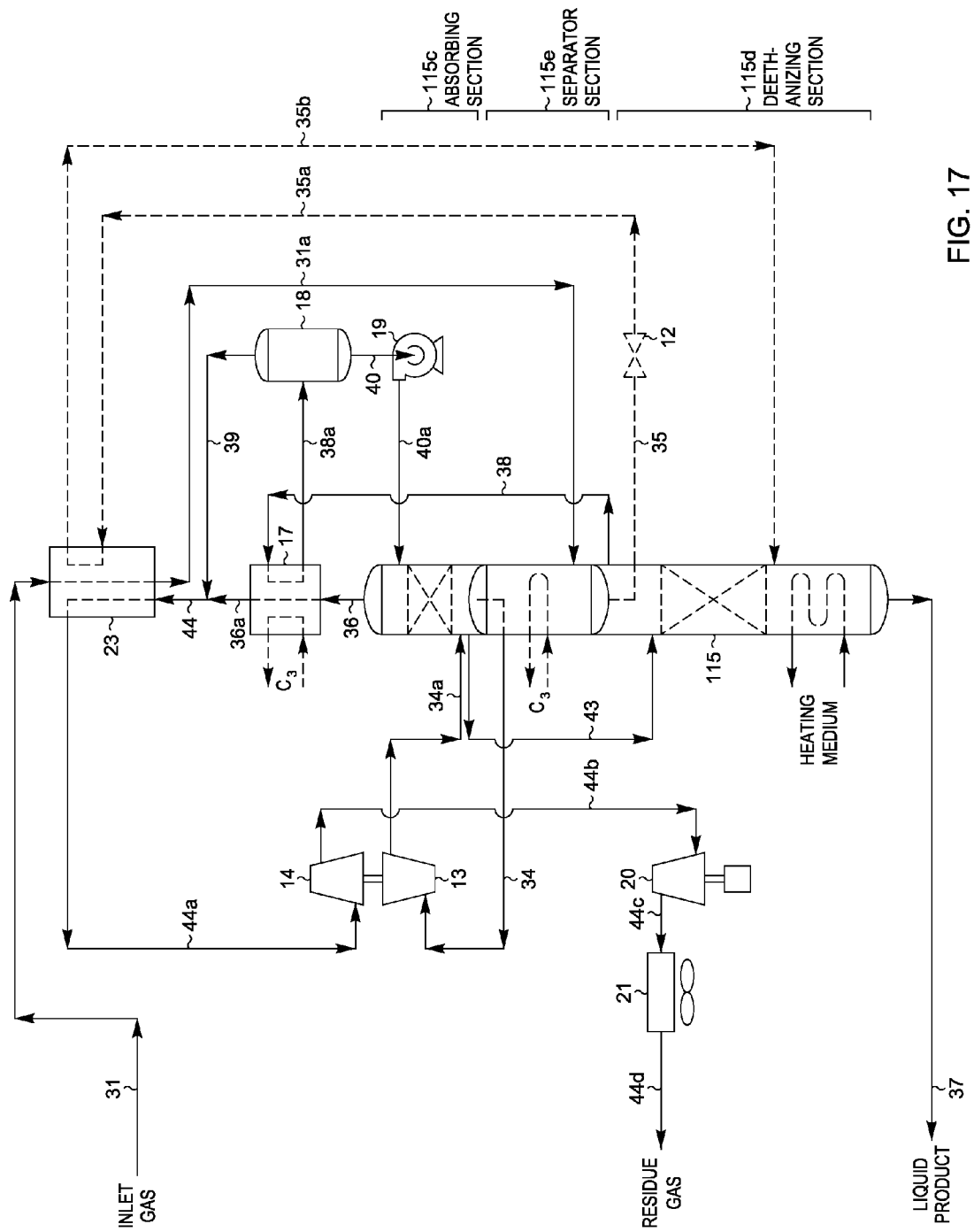
Figure 20:
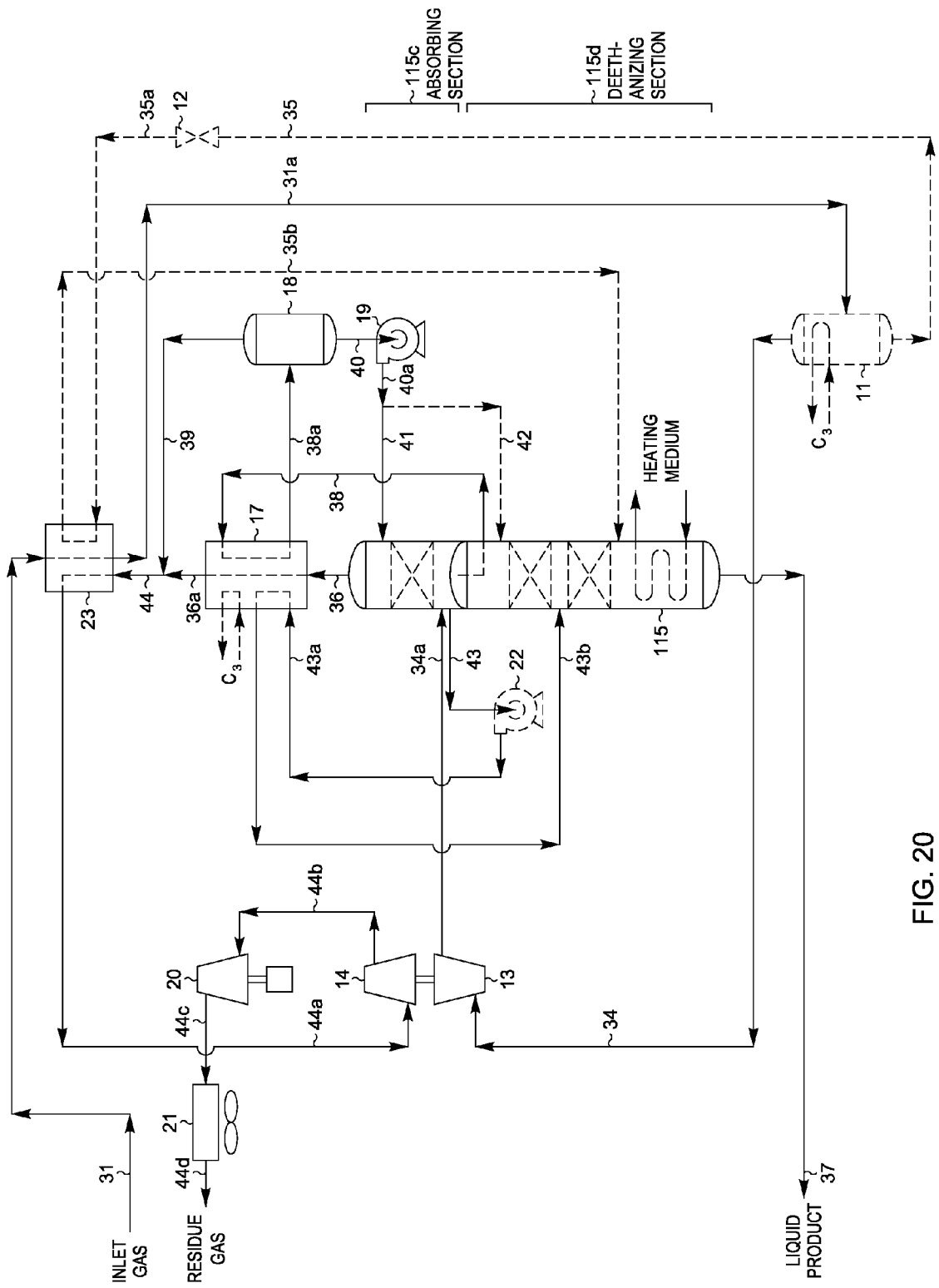
Figure 21:
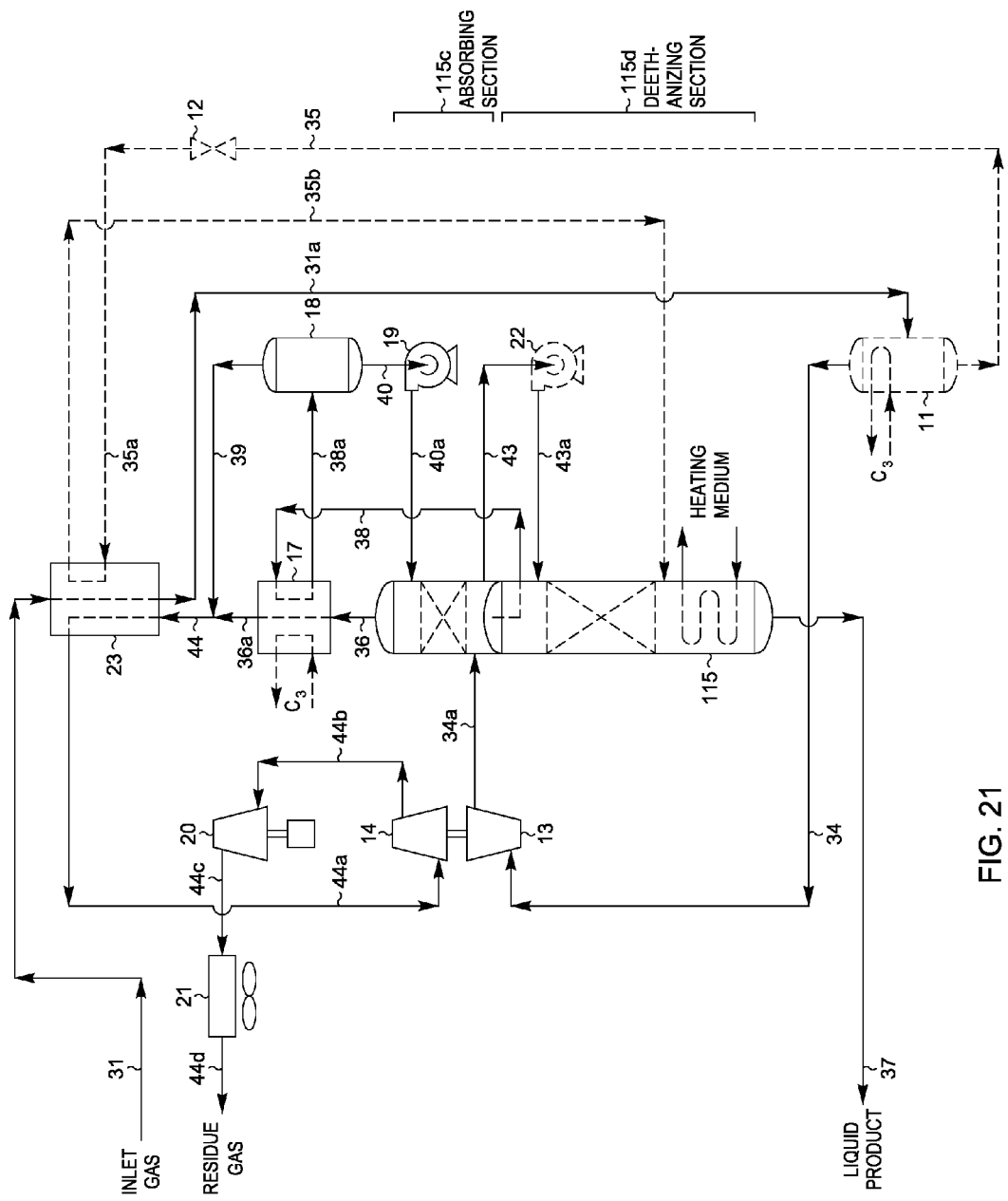

The use and distribution of the liquid stream 35 from separator section 115*e* or separator 11 and distillation liquid stream 43 from absorbing section 115*c* for process heat exchange, the particular arrangement of heat exchangers for cooling feed gas (streams 31 and/or 32) and first distillation vapor stream 38, and the choice of process streams for specific heat exchange services must be evaluated for each particular application. For instance, FIGS. 4 through 6, 10 through 12, 16, and 20 depict using distillation liquid stream 43 to supply a portion of the cooling of first distillation vapor stream 38 in condensing section 115*b* (FIGS. 4, 5, 10, and 11), heat exchanger 10 (FIGS. 6 and 12), or heat exchanger 17 (FIGS. 16 and 20). In such cases, a heat and mass transfer means may not be needed in separator section 115*e* (FIGS. 4 through 6 and 16) or separator 11 (FIGS. 10 through 12 and 20). In the embodiments shown in FIGS. 4 and 10, a pump 22 is used to deliver distillation liquid stream 43 to the heat exchange means in condensing section 115*b*. In the embodiments shown in FIGS. 5 and 11, condensing section 115*b* is located below absorbing section 115*c* in processing assembly 115 so that flow of distillation liquid stream 43 is via thermosiphon circulation. In the embodiments shown in FIGS. 6 and 12, a heat exchanger 10 external to processing assembly 115 is employed and feed cooling section 115*a* is located below absorbing section 115*c* in processing assembly 115 so that flow of distillation liquid stream 43 is via thermosiphon circulation. (The embodiments shown in FIGS. 5, 6, 11, and 12 use reflux pump 19 to supply reflux to locations above the point in processing assembly 115 where the liquid phase condensed from stream 38 is collected.) In the embodiments shown in FIGS. 16 and 20, thermosiphon circulation may be sufficient to allow distillation liquid stream 43 to flow through heat exchanger 17, or pump 22 may be needed to circulate stream 43. Some circumstances may favor using distillation liquid stream 43 to cool stream 32 in a heat exchanger external to processing assembly 115, such as heat exchanger 10 depicted in FIGS. 3, 9, 15, and 19. Still other circumstances may favor no heating of distillation liquid stream 43 at all, and instead using distillation liquid stream 43 as the reflux to the upper region of deethanizing section 115*d* as shown in FIGS. 7, 13, 17, and 21. (For the embodiment shown in FIGS. 13 and 21, pump 22 may be needed because gravity flow of stream 43 may not be possible.)

Figure 14:
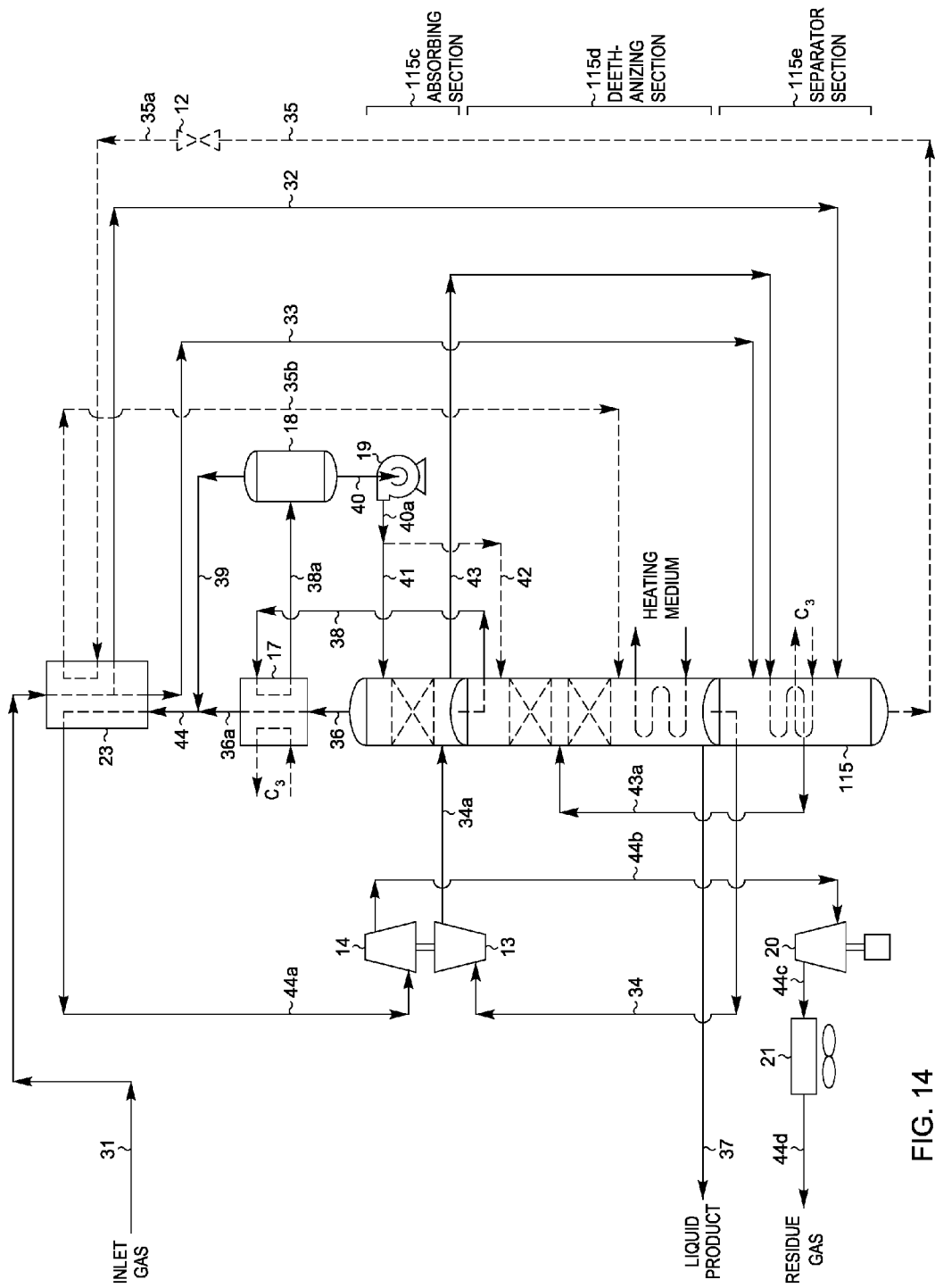
Figure 15:
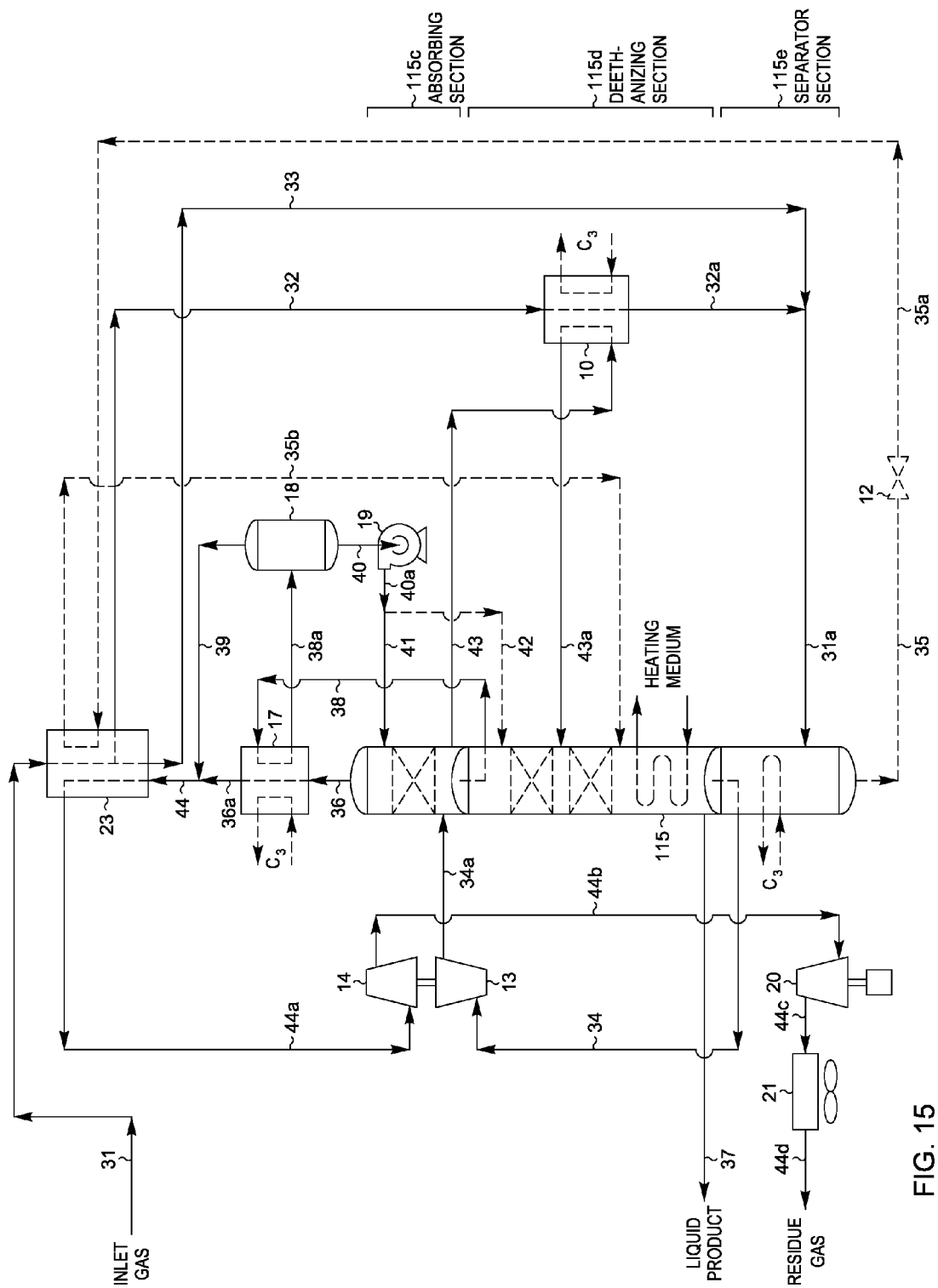

Depending on the quantity of heavier hydrocarbons in the feed gas and the feed gas pressure, the cooled first and second portions 32 and 33 entering separator section 115*e* in FIGS. 2 and 14 or separator 11 in FIGS. 8 and 18 (or the cooled feed stream 31*a* entering separator section 115*e* in FIGS. 3 through 7 and 15 through 17 or separator 11 in FIGS. 9 through 13 and 19 through 21) may not contain any liquid (because it is above its dewpoint, or because it is above its cricondenbar). In such cases, there is no liquid in stream 35 (as shown by the dashed lines). In such circumstances, separator section 115*e* in processing assembly 115 (FIGS. 2 through 7 and 14 through 17) or separator 11 (FIGS. 8 through 13 and 18 through 21) may not be required.

In accordance with the present invention, the use of external refrigeration to supplement the cooling available to the inlet gas and/or the first distillation vapor stream from the second distillation vapor stream and the distillation liquid stream may be employed, particularly in the case of a rich inlet gas. In such cases where additional inlet gas cooling is desired, a heat and mass transfer means may be included in separator section 115e (or a gas collecting means in such cases when the cooled first and second portions 32 and 33 or the cooled feed stream 31a contains no liquid) as shown by the dashed lines in FIGS. 3 through 7 and 15 through 17, or a heat and mass transfer means may be included in separator 11 as shown by the dashed lines in FIGS. 9 though 13 and 19 through 21. This heat and mass transfer means may be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between a refrigerant stream (e.g., propane) flowing through one pass of the heat and mass transfer means and the vapor portion of stream 31a flowing upward, so that the refrigerant further cools the vapor and condenses additional liquid, which falls downward to become part of the liquid removed in stream 35. As shown by the dashed lines in FIGS. 2, 8, 14, and 18, the heat and mass transfer means in separator section 115e (FIGS. 2 and 14) or separator 11 (FIGS. 8 and 18) may include provisions for providing supplemental cooling with refrigerant. Alternatively, conventional gas chiller(s) could be used to cool stream 32, stream 33, and/or stream 31a with refrigerant before streams 32 and 33 enter separator section 115e (FIGS. 2 and 14) or separator 11 (FIGS. 8 and 18) or stream 31a enters separator section 115e (FIGS. 3 through 7 and 15 through 17) or separator 11 (FIGS. 9 through 13 and 19 through 21). In cases where additional cooling of the first distillation vapor stream is desired, the heat exchange means in condensing section 115b of processing assembly 115 (FIGS. 2 through 5, 7 through 11, and 13), heat exchanger 10 (FIGS. 6 and 12), or heat exchanger 17 (FIGS. 14 through 21) may include provisions for providing supplemental cooling with refrigerant as shown by the dashed lines.

Depending on the type of heat transfer devices selected for the heat exchange means in feed cooling section 115a and condensing section 115b (FIGS. 2 through 5, 7 through 11, and 13), it may be possible to combine these heat exchange means in a single multi-pass and/or multi-service heat transfer device. In such cases, the multi-pass and/or multi-service heat transfer device will include appropriate means for distributing, segregating, and collecting stream 31, stream 32, stream 33, first distillation vapor stream 38, any vapor separated from the cooled stream 38, and the second distillation vapor stream in order to accomplish the desired cooling and heating.

It will also be recognized that the relative amount of condensed liquid that is split between streams 41 and 42 in FIGS. 2 through 6, 8 through 12, 14 through 16, and 18 through 20 will depend on several factors, including gas pressure, feed gas composition, and the quantity of horsepower available. The optimum split generally cannot be predicted without evaluating the particular circumstances for a specific application of the present invention. Some circumstances may favor feeding all of the condensed liquid to the upper region of absorbing section 115c in stream 41 and none to the upper region of deethanizing section 115d in stream 42, as shown by the dashed lines for stream 42. In such cases, the heated distillation liquid stream 43a may be supplied to the upper region of deethanizing section 115d to serve as reflux.

The present invention provides improved recovery of $C_3$ components and heavier hydrocarbon components per amount of utility consumption required to operate the process. An improvement in utility consumption required for operating the process may appear in the form of reduced power requirements for compression or re-compression, reduced power requirements for external refrigeration, reduced energy requirements for tower reboiling, or a combination thereof.

While there have been described what are believed to be preferred embodiments of the invention, those skilled in the art will recognize that other and further modifications may be made thereto, e.g. to adapt the invention to various conditions, types of feed, or other requirements without departing from the spirit of the present invention as defined by the following claims.

We claim:

1. A process for the separation of a gas stream containing methane, $C_2$ components, $C_3$ components, and heavier hydrocarbon components into a volatile residue gas fraction and a relatively less volatile fraction containing a major portion of said $C_3$ components and heavier hydrocarbon components wherein
   (1) said gas stream is cooled in a first heat exchange means;
   (2) said cooled gas stream is expanded to a lower pressure whereby the cooled gas stream is further cooled;
   (3) said expanded cooled gas stream is supplied as a bottom feed to an absorbing means housed in a single equipment item processing assembly;
   (4) a first distillation liquid stream is collected from a lower region of said absorbing means and supplied as a top feed to a mass transfer means housed in said processing assembly;
   (5) a first distillation vapor stream is collected from an upper region of said mass transfer means and cooled sufficiently to condense at least a part of said first distillation vapor stream in a second heat exchange means;
   (6) said at least partially condensed first distillation vapor stream is supplied to a separating means and is separated therein, thereby forming a condensed stream and a residual vapor stream containing any uncondensed vapor remaining after said first distillation vapor stream is cooled;
   (7) at least a portion of said condensed stream is supplied as a top feed to said absorbing means;
   (8) a second distillation vapor stream is collected from an upper region of said absorbing means and heated in said second heat exchange means, thereby to supply at least a portion of the cooling of step (5);
   (9) said heated second distillation vapor stream is combined with any said residual vapor stream to form a combined vapor stream;
   (10) said combined vapor stream is heated in said first heat exchange means, thereby to supply at least a portion of the cooling of step (1), and thereafter discharging said heated combined vapor stream as said volatile residue gas fraction;
   (11) a second distillation liquid stream is collected from a lower region of said mass transfer means and heated in a heat and mass transfer means housed in said processing assembly, thereby to simultaneously strip the more volatile components from said second distillation liquid stream, and thereafter discharging said heated and stripped second distillation liquid stream from said processing assembly as said relatively less volatile fraction; and

(12) the quantities and temperatures of said feed streams to said absorbing means are effective to maintain the temperature of said upper region of said absorbing means at a temperature whereby the major portions of the components in said relatively less volatile fraction are recovered.

2. The process according to claim 1 wherein
(a) said gas stream is cooled sufficiently to partially condense said gas stream in said first heat exchange means;
(b) said partially condensed gas stream is supplied to a further separating means and is separated therein to provide a vapor stream and at least one liquid stream;
(c) said vapor stream is expanded to lower pressure whereby said vapor stream is further cooled;
(d) said expanded cooled vapor stream is supplied as said bottom feed to said absorbing means;
(e) said at least one liquid stream is expanded to said lower pressure; and
(f) said expanded at least one liquid stream is heated in said first heat exchange means, thereby to supply at least a portion of the cooling of step (a), and thereafter supplying said heated expanded at least one liquid stream as a bottom feed to said mass transfer means.

3. The process according to claim 1 wherein
(a) said first distillation liquid stream is collected from said lower region of said absorbing means and heated in said second heat exchange means, with said heated first distillation liquid stream thereafter supplied as said top feed to mass transfer means; and
(b) said first distillation vapor stream is collected from an upper region of said mass transfer means and cooled sufficiently to condense at least a part of said first distillation vapor stream in said second heat exchange means, thereby to supply at least a portion of the heating of step (a).

4. The process according to claim 3 wherein
(i) said gas stream is cooled sufficiently to partially condense said gas stream in said first heat exchange means;
(ii) said partially condensed gas stream is supplied to a further separating means and is separated therein to provide a vapor stream and at least one liquid stream;
(iii) said vapor stream is expanded to lower pressure whereby said vapor stream is further cooled;
(iv) said expanded cooled vapor stream is supplied as said bottom feed to said absorbing means;
(v) said at least one liquid stream is expanded to said lower pressure; and
(vi) said expanded at least one liquid stream is heated in said first heat exchange means, thereby to supply at least a portion of the cooling of step (i), and thereafter supplying said heated expanded at least one liquid stream as a bottom feed to said mass transfer means.

5. The process according to claim 1 wherein
(a) said gas stream is partially cooled in said first heat exchange means;
(b) said partially cooled gas stream is divided into first and second portions;
(c) said first portion is further cooled in a further heat and mass transfer means housed in a further separating means, thereby to simultaneously condense any less volatile components from said first portion;
(d) said second portion is further cooled in said first heat exchange means;
(e) said further cooled first portion and said further cooled second portion are combined to form said cooled gas stream;
(f) said first distillation liquid stream is collected from said lower region of said absorbing means and heated in said further heat and mass transfer means, thereby to supply at least a portion of the cooling of step (c), with said heated first distillation liquid stream thereafter supplied as said top feed to said mass transfer means; and
(g) said combined vapor stream is heated in said first heat exchange means, thereby to supply at least a portion of the cooling of steps (a) and (d), and thereafter discharging said heated combined vapor stream as said volatile residue gas fraction.

6. The process according to claim 5 wherein
(i) said further cooled second portion is directed to said further separating means so that any liquids condensed as said first portion is further cooled and as said second portion is further cooled are combined to form at least one liquid stream, with the remainder of said further cooled first portion and said further cooled second portion forming a vapor stream;
(ii) said vapor stream is expanded to lower pressure whereby said vapor stream is further cooled;
(iii) said expanded cooled vapor stream is supplied as said bottom feed to said absorbing means;
(iv) said at least one liquid stream is expanded to said lower pressure; and
(v) said expanded at least one liquid stream is heated in said first heat exchange means, thereby to supply at least a portion of said partial cooling of step (a), and thereafter supplying said heated expanded at least one liquid stream as a bottom feed to said mass transfer means.

7. The process according to claim 1 wherein
(i) said gas stream is partially cooled in said first heat exchange means;
(ii) said partially cooled gas stream is divided into first and second portions;
(iii) said first portion is further cooled in a third heat exchange means;
(iv) said second portion is further cooled in said first heat exchange means;
(v) said further cooled first portion and said further cooled second portion are combined to form said cooled gas stream; and
(vi) said first distillation liquid stream is collected from said lower region of said absorbing means and heated in said third heat exchange means, thereby to supply at least a portion of the cooling of step (iii), with said heated first distillation liquid stream thereafter supplied as said top feed to said mass transfer means.

8. The process according to claim 7 wherein
(A) said further cooled first portion and said further cooled second portion are combined to form a partially condensed gas stream;
(B) said partially condensed gas stream is supplied to said further separating means and is separated therein to provide a vapor stream and at least one liquid stream;
(C) said vapor stream is expanded to lower pressure whereby said vapor stream is further cooled;
(D) said expanded cooled vapor stream is supplied as said bottom feed to said absorbing means;
(E) said at least one liquid stream is expanded to said lower pressure; and
(F) said expanded at least one liquid stream is heated in said first heat exchange means, thereby to supply at least a portion of said partial cooling of step (A), and thereafter supplying said heated expanded at least one liquid stream as a bottom feed to said mass transfer means.

9. The process according to claim 2 wherein said further separating means is housed in said processing assembly.

10. The process according to claim 4 or 8 wherein said further separating means is housed in said processing assembly.

11. The process according to claim 5 or 6 wherein said further separating means is housed in said processing assembly.

12. The process according to claim 3 or 7 wherein
(1) said heated first distillation liquid stream is supplied to said mass transfer means at an intermediate feed position;
(2) said condensed stream is divided into at least first and second reflux streams;
(3) said first reflux stream is supplied as said top feed to said absorbing means; and
(4) said second reflux stream is supplied as said top feed to said mass transfer means.

13. The process according to claim 4 or 8 wherein
(1) said heated first distillation liquid stream is supplied to said mass transfer means at an intermediate feed position;
(2) said condensed stream is divided into at least first and second reflux streams;
(3) said first reflux stream is supplied as said top feed to said absorbing means; and
(4) said second reflux stream is supplied as said top feed to said mass transfer means.

14. The process according to claim 5 or 6 wherein
(1) said heated first distillation liquid stream is supplied to said mass transfer means at an intermediate feed position;
(2) said condensed stream is divided into at least first and second reflux streams;
(3) said first reflux stream is supplied as said top feed to said absorbing means; and
(4) said second reflux stream is supplied as said top feed to said mass transfer means.

15. The process according to claim 10 wherein
(1) said heated first distillation liquid stream is supplied to said mass transfer means at an intermediate teed position;
(2) said condensed stream is divided into at least first and second reflux streams;
(3) said first reflux stream is supplied as said top feed to said absorbing means; and
(4) said second reflux stream is supplied as said top feed to said mass transfer means.

16. The process according to claim 11 wherein
(1) said heated first distillation liquid stream is supplied to said mass transfer means at an intermediate feed position;
(2) said condensed stream is divided into at least first and second reflux streams;
(3) said first reflux stream is supplied as said top feed to said absorbing means; and
(4) said second reflux stream is supplied as said top feed to said mass transfer means.

17. The process according to claim 1, 3 or 7 wherein
(1) a gas collecting means is housed in said processing assembly;
(2) an additional heat and mass transfer means is included inside said gas collecting means, said additional heat and mass transfer means including one or more passes for an external refrigeration medium;
(3) said cooled gas stream is supplied to said gas collecting means and directed to said additional heat and mass transfer means to be further cooled by said external refrigeration medium; and
(4) said further cooled gas stream is expanded to said lower pressure and thereafter supplied as said bottom feed to said absorbing means.

18. The process according to claim 12 wherein
(1) a gas collecting means is housed in said processing assembly;
(2) an additional heat and mass transfer means is included inside said gas collecting means, said additional heat and mass transfer means including one or more passes for an external refrigeration medium;
(3) said cooled gas stream is supplied to said gas collecting means and directed to said additional heat and mass transfer means to be further cooled by said external refrigeration medium; and
(4) said further cooled gas stream is expanded to said lower pressure and thereafter supplied as said bottom feed to said absorbing means.

19. The process according to claim 9, 2, 4 or 8 wherein
(1) an additional heat and mass transfer means is included inside said further separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

20. The process according to claim 10 wherein
(1) an additional heat and mass transfer means is included inside said further separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

21. The process according to claim 13 wherein
(1) an additional heat and mass transfer means is included inside said further separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

22. The process according to claim 15 wherein
(1) an additional heat and mass transfer means is included inside said further separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

23. An apparatus for the separation of a gas stream containing methane, $C_2$ components, $C_3$ components, and heavier hydrocarbon components into a volatile residue gas fraction and a relatively less volatile fraction containing a major portion of said $C_3$ components and heavier hydrocarbon components comprising (1) first heat exchange means to cool said gas stream;
(2) expansion means connected to said first heat exchange means to receive said cooled gas stream and expand said cooled gas stream to lower pressure;
(3) absorbing means housed in a single equipment item processing assembly and connected to said expansion means to receive said expanded cooled gas stream as a bottom feed thereto;
(4) first liquid collecting means housed in said processing assembly and connected to said absorbing means to receive a first distillation liquid stream from a lower region of said absorbing means;
(5) mass transfer means housed in said processing assembly and connected to said first liquid collecting means to receive said first distillation liquid stream as a top feed thereto;
(6) first vapor collecting means housed in said processing assembly and connected to said mass transfer means to receive a first distillation vapor stream from an upper region of said mass transfer means;
(7) second heat exchange means connected to said first vapor collecting means to receive said first distillation vapor stream and cool said first distillation vapor stream sufficiently to condense at least a part of said first distillation vapor stream;
(8) separating means connected to said second heat exchange means to receive said at least partially condensed first distillation vapor stream and separate said at least partially condensed first distillation vapor stream into a condensed stream and a residual vapor stream containing any uncondensed vapor remaining after said first distillation vapor stream is cooled;
(9) said absorbing means being further connected to said separating means to receive at least a portion of said condensed stream as a top feed thereto;
(10) second vapor collecting means housed in said processing assembly and connected to said absorbing means to receive a second distillation vapor stream from an upper region of said absorbing means;
(11) said second heat exchange means being further connected to said second vapor collecting means to receive said second distillation vapor stream and heat said second distillation vapor stream, thereby to supply at least a portion of the cooling of step (7);
(12) combining means connected to said second heat exchange means and said separating means to receive said heated second distillation vapor stream and any said residual vapor stream and form a combined vapor stream;
(13) said first heat exchange means being further connected to said combining means to receive said combined vapor stream and heat said combined vapor stream, thereby to supply at least a portion of the cooling of step (1), and thereafter discharging said heated combined vapor stream as said volatile residue gas fraction;
(14) second liquid collecting means housed in said processing assembly and connected to said mass transfer means to receive a second distillation liquid stream from a lower region of said mass transfer means;
(15) heat and mass transfer means housed in said processing assembly and connected to said second liquid collecting means to receive said second distillation liquid stream and heat said second distillation liquid stream, thereby to simultaneously strip the more volatile components from said second distillation liquid stream, and thereafter discharging said heated and stripped second distillation liquid stream from said processing assembly as said relatively less volatile fraction; and
(16) control means adapted to regulate the quantities and temperatures of said feed streams to said absorbing means to maintain the temperature of said upper region of said absorbing means at a temperature whereby the major portions of the components in said relatively less volatile fraction are recovered.

24. The apparatus according to claim 23 wherein
(a) said first heat exchange means is adapted to cool said gas stream sufficiently to partially condense said gas stream;
(b) a further separating means is connected to said first heat exchange means to receive said partially condensed gas stream and separate said partially condensed gas stream into a vapor stream and at least one liquid stream;
(c) said expansion means is connected to said further separating means to receive said vapor stream and expand said vapor stream to lower pressure whereby said vapor stream is further cooled;
(d) said absorbing means is connected to said expansion means to receive said expanded cooled vapor stream as said bottom feed thereto;
(e) a further expansion means is connected to said further separating means to receive said at least one liquid stream and expand said at least one liquid stream to said lower pressure; and
(f) said first heat exchange means is further connected to said further expansion means to receive said expanded at least one liquid stream and heat said expanded at least one liquid stream, thereby to supply at least a portion of the cooling of step (a), said first heat exchange means being further connected to said mass transfer means to supply said heated expanded at least one liquid stream as a bottom feed thereto.

25. The apparatus according to claim 23 wherein
(a) said second heat exchange means is further connected to said first liquid collecting means to receive said first distillation liquid stream and heat said first distillation liquid stream, thereby to supply at least a portion of said cooling of said first distillation vapor stream;
(b) said mass transfer means is connected to said second heat exchange means to receive said heated first distillation liquid stream as said top feed thereto; and
(c) said second heat exchange means is further connected to said first vapor collecting means to receive said first distillation vapor stream and cool said first distillation vapor stream sufficiently to condense at least a part of said first distillation vapor stream, thereby to supply at least a portion of the heating of step (a).

26. The apparatus according to claim 25 wherein
(i) said first heat exchange means is adapted to cool said gas stream sufficiently to partially condense said gas stream;
(ii) a further separating means is connected to said first heat exchange means to receive said partially condensed gas stream and separate said partially condensed gas stream into a vapor stream and at least one liquid stream;
(iii) said expansion means is connected to said further separating means to receive said vapor stream and expand said vapor stream to lower pressure whereby said vapor stream is further cooled;
(iv) said absorbing means is connected to said expansion means to receive said expanded cooled vapor stream as said bottom feed thereto;

(v) a further expansion means is connected to said further separating means to receive said at least one liquid stream and expand said at least one liquid stream to said lower pressure; and (vi) said first heat exchange means is further connected to said further expansion means to receive said expanded at least one liquid stream and heat said expanded at least one liquid stream, thereby to supply at least a portion of the cooling of step (i), said first heat exchange means being further connected to said mass transfer means to supply said heated expanded at least one liquid stream as a bottom feed thereto.

27. The apparatus according to claim 23 wherein (a) said first heat exchange means is adapted to partially cool said gas stream;

(b) a dividing means is connected to said first heat exchange means to receive said partially cooled gas stream and divide said partially cooled gas stream into first and second portions;

(c) a further heat and mass transfer means is housed in a further separating means and is connected to said dividing means to receive said first portion and further cool said first portion, thereby to simultaneously condense any less volatile components from said first portion;

(d) said first heat exchange means is further connected to said dividing means to receive said second portion and further cool said second portion;

(e) a further combining means is connected to said further heat and mass transfer means and said first heat exchange means to receive said further cooled first portion and said further cooled second portion and form a cooled gas stream; (f) said expansion means is connected to said further combining means to receive said cooled gas stream and expand said cooled gas stream to lower pressure;

(g) said further heat and mass transfer means is further connected to said first liquid collecting means to receive said first distillation liquid stream and heat said first distillation liquid stream, thereby to supply at least a portion of the cooling of step (c);

(h) said mass transfer means is connected to said further heat and mass transfer means to receive said heated first distillation liquid stream as said top feed thereto; and (i) said first heat exchange means is further connected to said combining means to receive said combined vapor stream and heat said combined vapor stream, thereby to supply at least a portion of the cooling of steps (a) and (d), and thereafter discharging said heated combined vapor stream as said volatile residue gas fraction.

28. The apparatus according to claim 27 wherein (i) said further separating means is further connected to said first heat exchange means to receive said further cooled second portion so that any liquids condensed as said first portion is further cooled and as said second portion is further cooled are combined to form at least one liquid stream, with the remainder of said further cooled first portion and said further cooled second portion forming a vapor stream;

(ii) said expansion means is connected to said further separating means to receive said vapor stream and expand said vapor stream to lower pressure whereby said vapor stream is further cooled;

(iii) said absorbing means is connected to said expansion means to receive said expanded cooled vapor stream as said bottom feed thereto;

(iv) a further expansion means is connected to said further separating means to receive said at least one liquid stream and expand said at least one liquid stream to said lower pressure; and (v) said first heat exchange means is further connected to said further expansion means to receive said expanded at least one liquid stream and heat said expanded at last one liquid stream, thereby to supply at least a portion of said partial cooling of step (a), said first heat exchange means being further connected to said mass transfer means to supply said heated expanded at least one liquid stream as a bottom feed thereto.

29. The apparatus according to claim 27 wherein (i) a third heat exchange means is connected to said dividing means to receive said first portion and further cool said first portion;

(ii) said further combining means is connected to said third heat exchange means and said first heat exchange means to receive said further cooled first portion and said further cooled second portion and form said cooled gas stream;

(iii) said third heat exchange means is further connected to said first liquid collecting means to receive said first distillation liquid stream and heat said first distillation liquid stream, thereby to supply at least a portion of the cooling of step (i); and (iv) said mass transfer means is connected to said third heat exchange means to receive said heated first distillation liquid stream as said top feed thereto.

30. The apparatus according to claim 29 wherein (A) said further combining means is adapted to receive said further cooled first portion and said further cooled second portion and form a partially condensed gas stream;

(B) said further separating means is connected to said further combining means to receive said partially condensed gas stream and separate said partially condensed gas stream into a vapor stream and at least one liquid stream;

(C) said expansion means is connected to said further separating means to receive said vapor stream and expand said vapor stream to lower pressure whereby said vapor stream is further cooled;

(D) said absorbing means is connected to said expansion means to receive said expanded cooled vapor stream as said bottom feed thereto;

(E) a further expansion means is connected to said further separating means to receive said at least one liquid stream and expand said at least one liquid stream to said lower pressure; and (F) said first heat exchange means is further connected to said further expansion means to receive said expanded at least one liquid stream and heat said expanded at least one liquid stream, thereby to supply at least a portion of said partial cooling of step (A), said first heat exchange means being further connected to said mass transfer means to supply said heated expanded at least one liquid stream as a bottom feed thereto.

31. The apparatus according to claim 24 wherein said further separating means is housed in said processing assembly.

32. The apparatus according to claim 26 wherein said further separating means is housed in said processing assembly.

33. The apparatus according to claim 26 or 28 wherein said further separating means is housed in said processing assembly.

34. The apparatus according to claim 30 wherein said further separating means is housed in said processing assembly.

35. The apparatus according to claim 25 wherein
   (1) said mass transfer means is adapted to be connected to said second heat exchange means to receive said heated first distillation liquid stream at an intermediate feed position;
   (2) a dividing means is connected to said separating means to receive said condensed stream and divide said condensed stream into at least first and second reflux streams;
   (3) said absorbing means is adapted to be connected to said dividing means to receive said first reflux stream as said top feed thereto; and
   (4) said mass transfer means is adapted to be connected to said dividing means to receive said second reflux stream as said top feed thereto.

36. The apparatus according to claim 29 wherein
   (1) said mass transfer means is adapted to be connected to said second heat exchange means to receive said heated first distillation liquid stream at an intermediate feed position;
   (2) an additional dividing means is connected to said separating means to receive said condensed stream and divide said condensed stream into at least first and second reflux streams;
   (3) said absorbing means is adapted to be connected to said additional dividing means to receive said first reflux stream as said top feed thereto; and
   (4) said mass transfer means is adapted to be connected to said additional dividing means to receive said second reflux stream as said top feed thereto.

37. The apparatus according to claim 26 wherein
   (1) said mass transfer means is adapted to be connected to said second heat exchange means to receive said heated first distillation liquid stream at an intermediate feed position;
   (2) a dividing means is connected to said second separating means to receive said condensed stream and divide said condensed stream into at least first and second reflux streams;
   (3) said absorbing means is adapted to be connected to said dividing means to receive said first reflux stream as said top feed thereto; and
   (4) said mass transfer means is adapted to be connected to said dividing means to receive said second reflux stream as said top feed thereto.

38. The apparatus according to claim 27 or 28 wherein
   (1) said mass transfer means is adapted to be connected to said further heat and mass transfer means to receive said heated first distillation liquid stream at an intermediate feed position;
   (2) an additional dividing means is connected to said separating means to receive said condensed stream and divide condensed stream into at least first and second reflux streams;
   (3) said absorbing means is adapted to be connected to said additional dividing means to receive said first reflux stream as said top feed thereto; and
   (4) said mass transfer means is adapted to be connected to said additional dividing means to receive said second reflux stream as said top feed thereto.

39. The apparatus according to claim 34 or 30 wherein
   (1) said mass transfer means is adapted to be connected to said second heat exchange means to receive said heated first distillation liquid stream at an intermediate feed position;
   (2) an additional dividing means is connected to said separating means to receive said condensed stream and divide said condensed stream into at least first and second reflux streams;
   (3) said absorbing means is adapted to be connected to said additional dividing means to receive said first reflux stream as said top feed thereto; and
   (4) said mass transfer means is adapted to be connected to said additional dividing means to receive said second reflux stream as said top feed thereto.

40. The apparatus according to claim 32 wherein
   (1) said mass transfer means is adapted to be connected to said third heat exchange means to receive said heated first distillation liquid stream at an intermediate feed position;
   (2) a dividing means is connected to said second separating means to receive said condensed stream and divide said condensed stream into at least first and second reflux streams;
   (3) said absorbing means is adapted to be connected to said dividing means to receive said first reflux stream as said top feed thereto; and
   (4) said mass transfer means is adapted to be connected to said dividing means to receive said second reflux stream as said top feed thereto.

41. The apparatus according to claim 33 wherein
   (1) said mass transfer means is adapted to be connected to said further heat and mass means to receive said heated first distillation liquid stream at an intermediate feed position;
   (2) an additional dividing means is connected to said second separating means to receive said condensed stream and divide said condensed stream into at least first and second reflux streams;
   (3) said absorbing means is adapted to be connected to said additional dividing means to receive said first reflux stream as said top feed thereto; and
   (4) said mass transfer means is adapted to be connected to said additional dividing means to receive said second reflux stream as said top feed thereto.

42. The apparatus according to claim 23, 35, or 25 wherein
   (1) a gas collecting means is housed in said processing assembly;
   (2) an additional heat and mass transfer means is included inside said gas collecting means, said additional heat and mass transfer means including one or mote passes for an external refrigeration medium;
   (3) said gas collecting means is connected to said first heat exchange means to receive said cooled gas stream and direct said cooled gas stream to said additional heat and mass transfer means to be further cooled by said external refrigeration medium; and
   (4) said expansion means is adapted to be connected to said gas collecting means to receive said further cooled gas stream and expand further cooled gas stream to said lower pressure, said expansion means being further connected to said absorbing means to supply said expanded further cooled gas stream as said bottom feed thereto.

43. The apparatus according to claim 36 or 29 wherein
   (1) a gas collecting means is housed in said processing assembly;
   (2) an additional heat and mass transfer means is included inside said gas collecting means, said additional heat and mass transfer means including one or more passes for an external refrigeration medium;
   (3) said gas collecting means is connected to said further combining means to receive said cooled gas stream and direct said cooled gas stream to said additional heat and mass transfer means to be further cooled by said external refrigeration medium; and (4) said expansion means is adapted to be connected to said gas collecting means to receive said further cooled gas stream and expand said further cooled gas stream to said lower pressure, said expansion means being further connected to said absorbing means to supply said expanded further cooled gas stream as said bottom feed thereto.

44. The apparatus according to claim 31, 32, 34, 37, 40, 24, 26 or 30 wherein (1) an additional heat and mass transfer means is included inside said further separating means, said additional heat and mass transfer means including one or more passes for an external refrigeration medium;

(2) said vapor stream is directed to said additional heat and mass transfer means to be cooled by said external refrigeration medium to form additional condensate; and (3) said condensate becomes a part of said at least one liquid stream separated therein.

45. The apparatus according to claim 39 wherein (1) an additional heat and mass transfer means is included inside said further separating means, said additional heat and mass transfer means including one or more passes for an external refrigeration medium;

(2) said vapor stream is directed to said additional heat and mass transfer means to be cooled by said external refrigeration medium to form additional condensate; and (3) said condensate becomes a part of said at least one liquid stream separated therein.

\* \* \* \* \*

UNITED STATES PATENT AND TRADEMARK OFFICE
CERTIFICATE OF CORRECTION

Page 1 of 2

PATENT NO. : 9,074,814 B2
APPLICATION NO. : 13/051682
DATED : July 7, 2015
INVENTOR(S) : Andrew F. Johnke et al.

It is certified that error appears in the above-identified patent and that said Letters Patent is hereby corrected as shown below:

ON TITLE PAGE 2 [56] References Cited, OTHER PUBLICATIONS:

Under "P&ID Fuel Gas Conditioner," "prd&catiID" should read --prd&catID--.
Under "International Search Report" etc., (first entry), "pages." should read --20 pages.--.

In the Specification:

COLUMN 5:

Line 44, "the" should be deleted.

COLUMN 8:

Line 14, "withdraw" should read --withdrawn--.

In the Claims:

COLUMN 16:

Line 6, "teed" should read --feed--.

COLUMN 17:

Line 43, "teed" should read --feed--.

COLUMN 18:

Line 22, "claim 9, 2, 4 or 8," should read --claim 2, 4, 8 or 9,--.

Signed and Sealed this
Twenty-sixth Day of April, 2016

Michelle K. Lee
*Director of the United States Patent and Trademark Office*

In the Claims:

COLUMN 22:

Line 65, "claim 26" should read --claim 27--.

COLUMN 23:

Line 63, "claim 34 or 30" should read --claim 30 or 34,--.

COLUMN 24:

Line 41, "claim 23, 35, or 25" should read --claim 23, 25 or 35,--.
Line 46, "mote" should read --more--.
Line 59, "claim 36 or 29" should read --claim 29 or 36,--.

COLUMN 25:

Line 10, "claim 31, 32, 34, 37, 40, 24," should read --claim 24, 26, 30, 31, 32, 34, 37 or 40,--.
Line 11, "26 or 30" should be deleted.